(12) United States Patent
Nervi et al.

(10) Patent No.: US 10,330,564 B2
(45) Date of Patent: Jun. 25, 2019

(54) SYSTEM AND METHOD FOR PREDICTING DISTORTION OF A WORKPIECE RESULTING FROM A PEENING MACHINE PROCESS

(71) Applicant: The Boeing Company, Chicago, IL (US)

(72) Inventors: Sebastian Nervi, Saint Louis, MO (US); James B. Castle, Saint Charles, MO (US); William S. Hollensteiner, Kent, WA (US); Vincent R. Noble, Orting, WA (US)

(73) Assignee: The Boeing Company, Chicago, IL (US)

( * ) Notice: Subject to any disclaimer, the term of this patent is extended or adjusted under 35 U.S.C. 154(b) by 1194 days.

(21) Appl. No.: 13/886,339

(22) Filed: May 3, 2013

(65) Prior Publication Data
US 2014/0330525 A1 Nov. 6, 2014

(51) Int. Cl.
*G01M 5/00* (2006.01)
*G01L 5/00* (2006.01)
*G06F 17/50* (2006.01)

(52) U.S. Cl.
CPC ......... *G01M 5/0075* (2013.01); *G01L 5/0047* (2013.01); *G06F 17/5009* (2013.01); *G06F 17/5018* (2013.01); *G06F 2217/16* (2013.01)

(58) Field of Classification Search
CPC .. G01L 1/00; A61F 21/30942; G06F 17/5018; G09F 1/06; G06T 7/0614; B23K 33/00; H01H 61/02; G01M 5/0075
USPC ............. 700/98, 160; 40/606.12; 382/128; 416/198 A; 337/333
See application file for complete search history.

(56) References Cited

U.S. PATENT DOCUMENTS

| | | | |
|---|---|---|---|
| 3,876,335 A * | 4/1975 | Forcinal | F01D 5/06 416/198 |
| 5,796,617 A * | 8/1998 | St. Ville | A61F 2/30942 700/98 |
| 8,645,086 B1 | 2/2014 | Castle et al. | |
| 2003/0225476 A1* | 12/2003 | Mika | G06F 19/00 700/160 |
| 2006/0109075 A1* | 5/2006 | Cabal | H01H 61/02 337/333 |
| 2007/0023944 A1* | 2/2007 | Mika | B29C 65/00 264/42 |

(Continued)

OTHER PUBLICATIONS

Extended European Search Report, EP 14 15 8726 (dated 2014).

(Continued)

*Primary Examiner* — Regis J Betsch
*Assistant Examiner* — Kaleria Knox
(74) *Attorney, Agent, or Firm* — Walters & Wasylyna LLC

(57) ABSTRACT

A method for predicting distortion and residual stress in a workpiece resulting from a peening process may include the steps of providing a coupon including residual stress induced in a coupon surface by the peening process, calculating a moment coefficient representative of residual stress induced in the coupon surface, calibrating a stress function to the moment coefficient, applying the stress function to a workpiece model of the workpiece, and computing at least one of predicted distortion and residual stress of the workpiece resulting from application of the calibrated stress function to the workpiece model.

20 Claims, 25 Drawing Sheets

(56) References Cited

U.S. PATENT DOCUMENTS

| | | | | |
|---|---|---|---|---|
| 2010/0011641 | A1* | 1/2010 | Hill | G09F 1/06 40/606.12 |
| 2011/0129312 | A1* | 6/2011 | Kinoshita | B23P 15/28 407/119 |
| 2011/0286645 | A1* | 11/2011 | Hautvast | G06T 7/0014 382/128 |

OTHER PUBLICATIONS

Guagliano, "Relating Almen intensity to residual stresses induced by shot peening: a numerical approach," *Journal of Materials Processing Technology*, vol. 110, No. 3 (2001).

Mylonas et al., "Numerical modelling of shot peening process and corresponding products: Residual stress, surface roughness and cold work prediction," *Surface and Coating Technology*, vol. 205, No. 19 (2011).

Fuchs, "Defects and Virtues of the Almen Intensity Scale," Stanford University (1984).

Kirk et al., "Factors Affecting Almen Strips Curvature Reading," Proceedings of ICSP7 (1999).

Korunsky, "Residual Elastic Strain Due to Laser Shock Peening," *Journal of Strain Analysis for Engineering Design*, vol. 41, No. 3 (2006).

http://en.wikipedia.org/wiki/Almen_strip (2013).

http://www.indmetfin.com/Resources/Glossary.aspx (2013).

Chinese Patent Office, First Examination Report, Application No. 201410185019.8, (dated Feb. 23, 2017).

English Translation: Chinese Patent Office, First Examination Report, Application No. 201410185019.8, (dated Feb. 23, 2017).

Chinese Patent Office, Third Office Action, Application No. 201410185019.8, (dated Apr. 2, 2018).

English Translation, Chinese Patent Office, Third Office Action, Application No. 201410185019.8, (dated Apr. 2, 2018).

State Intellectual Property Office, Second Official Action (including English translation of same), Chinese Patent Application No. 201410185019.8 (dated 2017).

European Patent Office, "Communication pursuant to Article 94(3) EPC," App. No. 14 158 726.1 (dated Nov. 7, 2018).

State Intellectual Property Office of P.R.C., "Notification of the Decision of Rejection", with English translation, App. No. 201410185019.8 (dated Oct. 9, 2018).

\* cited by examiner

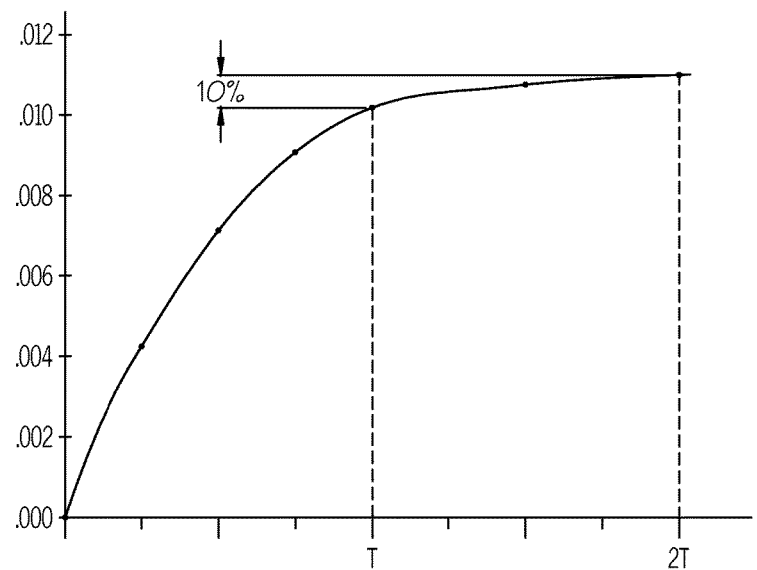
FIG. 5
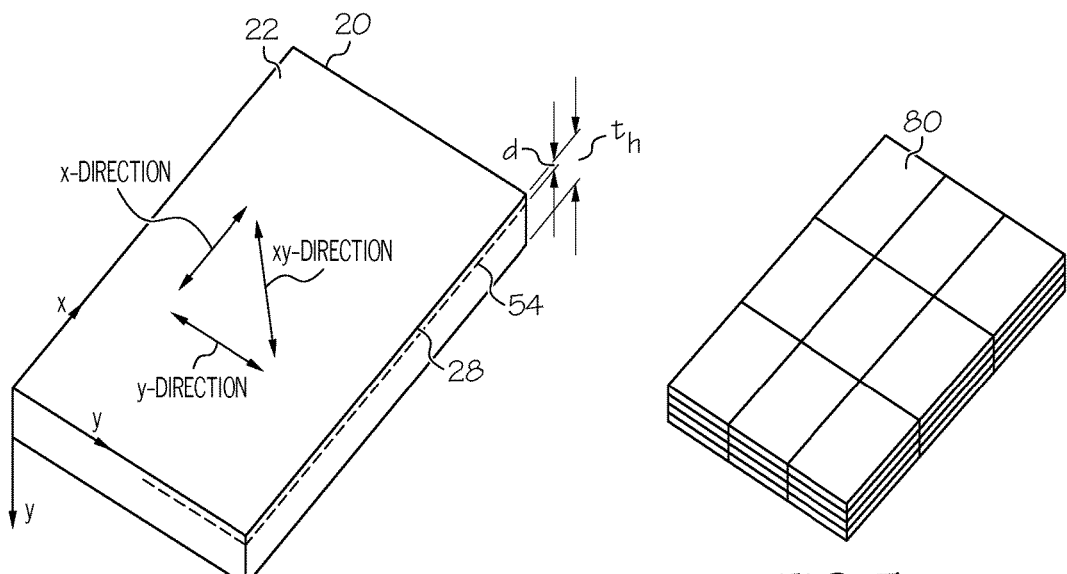
FIG. 6
FIG. 7

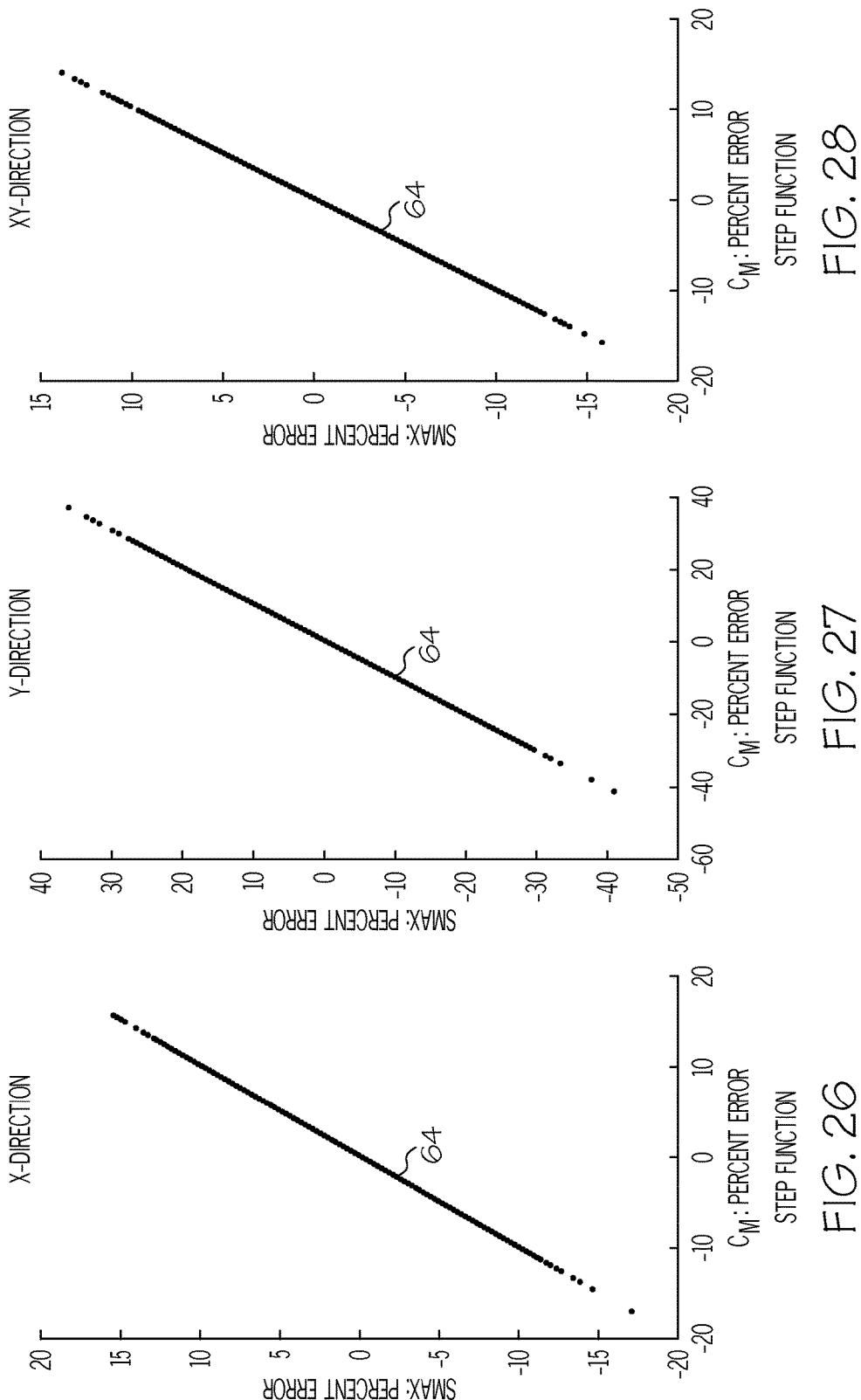

| FIXED DEPTH (in) | ERROR IN $C_F$ COMPUTATION | | | | | |
|---|---|---|---|---|---|---|
| | STEP FUNCTION | | | 3RD ORDER TERM FUNCTION | | |
| | X | Y | XY | X | Y | XY |
| 0.0001 | 0.3% | 0.3% | 0.8% | 0.4% | 0.5% | 0.9% |
| 0.0004 | -0.3% | -0.3% | 0.2% | 0.2% | 0.2% | 0.7% |
| 0.0007 | -0.9% | -0.9% | -0.4% | -0.1% | 0.0% | 0.4% |
| 0.0010 | -1.5% | -1.5% | -1.0% | -0.3% | -0.3% | 0.2% |
| 0.0013 | -2.2% | -2.1% | -1.7% | -0.5% | -0.5% | -0.1% |
| 0.0016 | -2.8% | -2.7% | -2.3% | -0.8% | -0.8% | -0.3% |
| 0.0019 | -3.4% | -3.4% | -2.9% | -1.0% | -1.0% | -0.6% |
| 0.0022 | -4.1% | -4.0% | -3.6% | -1.3% | -1.2% | -0.8% |

SYSTEM AND METHOD FOR PREDICTING DISTORTION OF A WORKPIECE RESULTING FROM A PEENING MACHINE PROCESS

FIELD

The present disclosure is generally related to residual stress induced in a workpiece and, more particularly, to a method for predicting distortion in a workpiece resulting from residual stress induced upon a surface of the workpiece by a peening process.

BACKGROUND

Shot peening is a cold working process used to produce a compressive residual stress layer and modify mechanical properties of metals. It entails impacting a surface with shot with force sufficient to create plastic deformation. Shot peening is often used as part of a machine process (e.g., metal forming) to improve fatigue life of a part. Shot peening can be useful in extending the fatigue life, stress corrosion resistance, and load carrying capacity of metal components. For example, fatigue failures may occur in areas of tension, thus by creating compressive residual stresses on the surface of the workpiece, the fatigue life can be enhanced.

Peening a surface spreads it plastically, causing changes in the mechanical properties of the surface. Shot peening is often called for in the aerospace industry to relieve tensile stresses built up in the grinding process and replace those stresses with beneficial compressive stresses. Depending on the part geometry, part material, shot material, shot quality, shot intensity, shot coverage; the shot peening process can significantly increase fatigue life of a component. Plastic deformation induces a residual compressive stress in a peened surface, along with tensile stress in the interior. Surface compressive stresses confer resistance to metal fatigue and to some forms of stress corrosion. The tensile stresses deep in the part are not as problematic as tensile stresses on the surface because cracks are less likely to start in the interior.

The beneficial effects of shot peening are mainly due to the residual stress field caused by the plastic deformation of the surface layer of material (e.g., a workpiece) resulting from the multiple impacts of the shot. Shot peening variables can affect performance of the final workpiece. Thus, it is important to know the values of the residual stresses in order to predict the mechanical strength of the peened parts and to know how these stresses vary by changing the shot peening parameters. By monitoring and controlling the parameters of the shot peening machine process, a consistent result can be obtained, while uncontrolled or uncalibrated shot peening can result in a widely scattered range of residual stresses, even cancelling out the benefits of shot peening or resulting in distortion of the workpiece.

Distortion is an undesirable affect of residual stress that may occur in a workpiece following a shot peening process. Distortion may be characterized as in-plane distortion or out-of-plane distortion. In-plane distortion includes expansion or contraction of the workpiece along a direction parallel to the plane of the workpiece surface. Out-of plane distortion includes displacement in the form of twisting and/or bending of the workpiece surface along a direction perpendicular to the surface.

Although the depth of shot peening-induced residual stress in a workpiece is typically shallow (e.g., 0.004 to 0.020 inch), out-of-plane distortion has a more noticeable effect on relatively thin metallic cross-sections that are less resistant to bending as compared to thicker cross-sections that are more resistant to bending. Unfortunately, moderate distortion may result in expensive and time-consuming inspection and reworking to bring the workpiece within design tolerances. Excessive distortion may lead to scrapping of the workpiece and fabrication of a replacement. Thus, it is also important to know the values of the residual stresses induced by the peening process in order to predict the effect of the residual stresses on the peened workpiece.

Experimental measurement of residual stresses is expensive, time consuming, and can be destructive to the peened workpiece. Non-destructive experimental measurement techniques, such as diffraction methods, can be highly superficial, can limit the size and shape of the measured component due to the inability to capture the diffracted x-rays, can be sensitive to material type (e.g., crystallographic structure), and provide only localized (e.g., pointwise) measurements. Further penetration depth requires at least some localized material removal (e.g., by chemical milling), thus becoming a destructive technique and preventing further in-service use of the measured workpiece.

An example method for predicting residual stresses on a work piece can involve performing an elastic analysis by applying an estimated residual stress field or initial strain field on a model of the workpiece (e.g., typically solved by the finite element method). The predicted residual stress can be obtained by modeling or measurements. Unfortunately, either approach have shown limitations due to difficulty on validating shot peening models and the inability to obtain accurate and representative experimental information at low cost.

Current methods of verifying the accuracy of the estimated residual stress due to shot peening are time-consuming. For example, current methods of verifying residual stress estimates require measuring residual stress in the peened workpiece and comparing the measurements to the predictions from the model solved using the finite element method. The parameters of the shot peening operation are then adjusted or the workpiece may be redesigned in an attempt to adjust the residual stress and distortion in the workpiece. The process is repeated in an iterative manner until the residual stress in the physical workpiece falls within the acceptable limits. Unfortunately, the process of iteratively adjusting the shot peening parameters, fabricating a new workpiece, measuring the residual stress in the new workpiece, and then re-adjusting the shot peening parameters is time consuming and costly.

The peening process (e.g., shot peening or laser peening) relies on test plate coupons (e.g., Almen strips) to calibrate the shot peening intensity. The Almen strip is a small hardened and tempered test strip, which curves on one side when submitted to the intensity of a shot blast stream. Following the peening process, the residual arc height over a fixed length is measured. This measurement defines the peening intensity, generally known as Almen intensity. The peening process is calibrated based on this Almen intensity up to the point that the peening intensity causes saturation on the coupon. Saturation is reached when further peening does not significantly change the arc deformation (e.g., arc height). However, quantifying peening intensity may not be related solely to the residual stress profile.

Thus, quantifying residual stress based on peening intensity measurements may not give accurate information about the residual stress field in the workpiece because different stress profiles may give the same arc height, the height being related to the integral of the residual stress field on the strip thickness. Furthermore, material type is not a characteristic utilized by the Almen strip method. The material used for the coupon is pre-defined (e.g., SAE 1070 spring steel), thus ignoring the actual material of the workpiece (e.g., 6061 aluminum, 7075 aluminum, CRES, Ti64, or any other metal).

Plastic deformation and saturation are directly related to the yield strength of the material of the workpiece. Thus, deformation and saturation for different materials are expected to differ significantly since their elasto-plastic behaviors are different. Therefore, translating peening intensity based on the standard Almen strip method can result in overestimation or underestimation of the residual stresses affecting the peened workpiece. For example, the detrimental effects from exceeding peening intensities (e.g., distortion) can be avoided, while the benefits of higher peening intensities (e.g., higher fatigue life) can be achieved. Due to the continued use of the Almen strip method, it is important to relate the residual stress field induced by shot peening in any mechanical part to Almen intensity.

Given the current state of the art, it is difficult to determine experimentally the complete initial strain field of a shot peened component or part. It is very expensive, time consuming, and error prone to do it for a discrete set of points with the existing experimental methods.

Similarly to the experimental (e.g., measured) results, complete "physics based" mathematical modeling of surface processes (e.g., peening) are extremely complex and difficult to verify and validate. For example, complex models require material parameters that are difficult and costly to obtain. Uncertainty and error propagation for complex physics based models can render the models useless if material data, boundary, and/or initial conditions are not well defined, and numerical verification is not implemented with extreme care (e.g., complex models do not lend themselves to be used by "non-experts". Moreover, even when using optimal numerical algorithms, these models are so computationally intensive that their use is limited to coupon size problems. Additionally, even if the initial strain field is known in detail, the computation of distortion for large components with high level of detailed information (e.g., spatial variations) may be difficult and computationally expensive.

Accordingly, those skilled in the art continue with research and development efforts in the field of predicting residual stress that occur in a workpiece resulting from a shot peening machine process.

SUMMARY

In one embodiment, disclosed is a method for predicting distortion in workpiece resulting from a peening process, the method may include the steps of (1) providing a coupon including residual stress induced in a coupon surface by the peening process, (2) calculating a moment coefficient representative of residual stress induced in the coupon surface, (3) calibrating a stress function to the moment coefficient, (4) applying the stress function to a workpiece model of the workpiece, and (5) computing a predicted distortion of the workpiece resulting from application of the calibrated stress function to the workpiece model.

In another embodiment, disclosed is a processor-based system for predicting distortion in a workpiece resulting from a peening process, the processor-based system may include a coefficient calculator configured for calculating a moment coefficient, a stress function calibrator configured for calibrating a stress function to the moment coefficient, a stress function applicator configured for applying the calibrated stress function to a workpiece model of the workpiece, and a distortion predictor configured for computing predicted distortion of the workpiece resulting from application of the calibrated stress function to the workpiece model.

Other embodiments of the disclosed system and method for predicting distortion in a workpiece resulting from a peening process will become apparent from the following detailed description, the accompanying drawings and the appended claims.

BRIEF DESCRIPTION OF THE DRAWINGS

FIG. 5 is an illustration of an example peening intensity curve;

FIG. 6 is a perspective illustration of an embodiment of the coupon and further illustrating the residual stress induced in a layer of the coupon surface by the peening machine process;

FIG. 7 is a perspective illustration of an embodiment of the finite element model of the coupon of FIG. 6;

FIG. 26 is an illustration of a graph of moment coefficient relative error versus stress magnitude relative error of a step function calibrated to the moment coefficient for the x-direction;

FIG. 27 is an illustration of a graph of moment coefficient relative error versus stress magnitude relative error of a step function calibrated to the moment coefficient for the y-direction;

FIG. 28 is an illustration of a graph of moment coefficient relative error versus stress magnitude relative error of a step function calibrated to the moment coefficient for the xy-direction;

DETAILED DESCRIPTION

Figure 1:
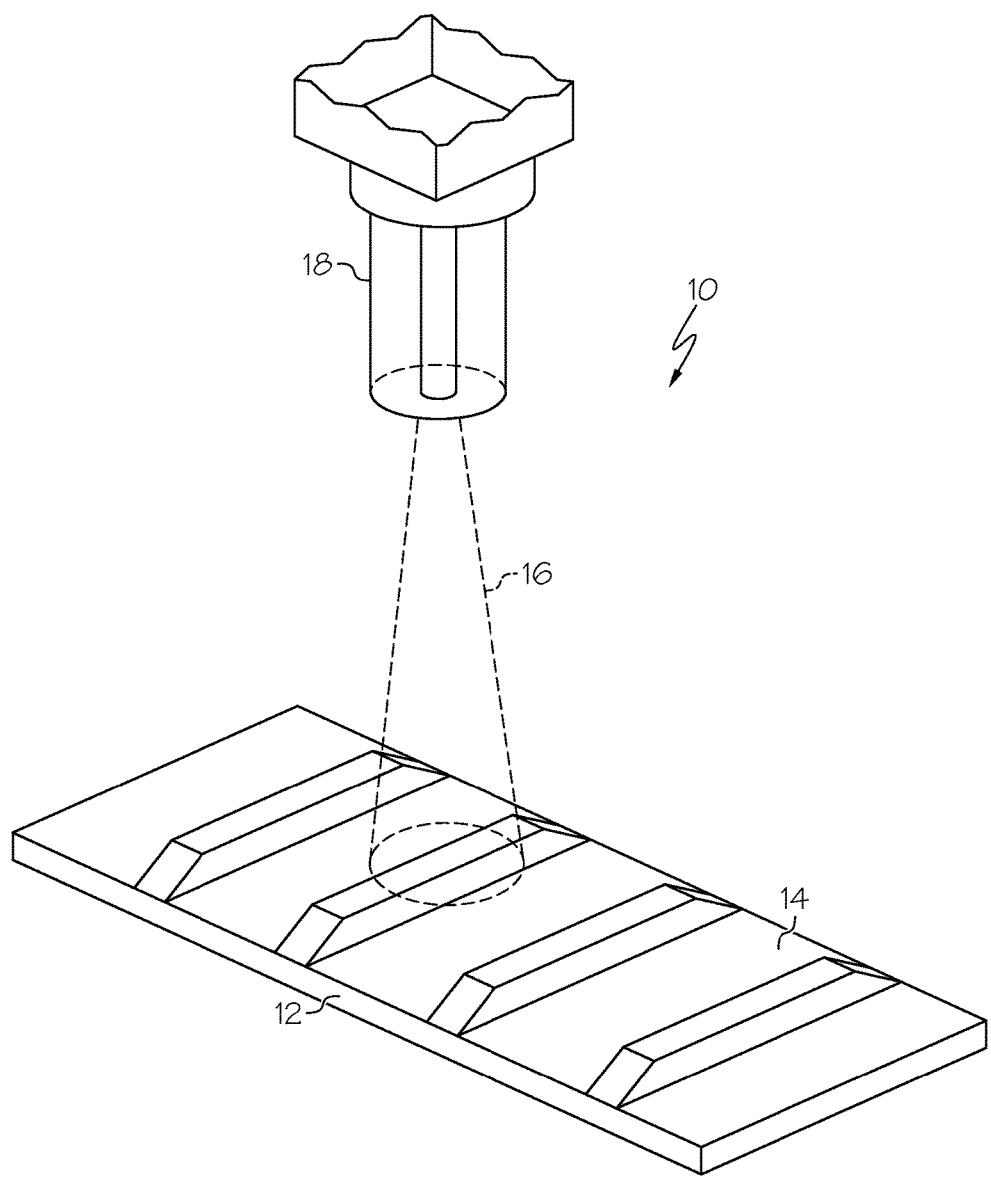
FIG. 1 is an illustration of a peening machine process applied to a surface of a workpiece to form a workpiece having residual stress uniformly induced along the workpiece surface.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

One embodiment of the disclosed method for predicting the distortion resulting from a shot peening machine process may provide for the characterization of shot peening intensity based on the peened material (e.g., workpiece) and may allow for the quantification of residual stains induced by the peening process.

Referring to FIG. 1, for the purpose of the present disclosure, a shot peening process 10 is described as a machining operation wherein a surface 14 of a workpiece 12 or a surface 22 of a coupon 20 (FIG. 2) may be impacted with shot 16 (e.g., round metallic, glass, or ceramic particles), such as from a blast nozzle 18. The material of the workpiece 12 or the plate coupon 20 (FIG. 2) may include any isotropic metallic or non-metallic material or any combination thereof, without limitation. The shot 16 may impact the surface 14 with force sufficient to create plastic deformation, causing changes in the mechanical properties of the workpiece 12. The plastic deformation may induce residual compressive stresses in the peened surface 14, along with tensile stress in the interior. Surface compressive stresses may confer resistance to metal fatigue and to some forms of stress corrosion. One skilled in the art can appreciate that tensile stress deep in the workpiece may not as problematic as tensile stresses on the surface because cracks are less likely to start in the interior.

Figure 2:
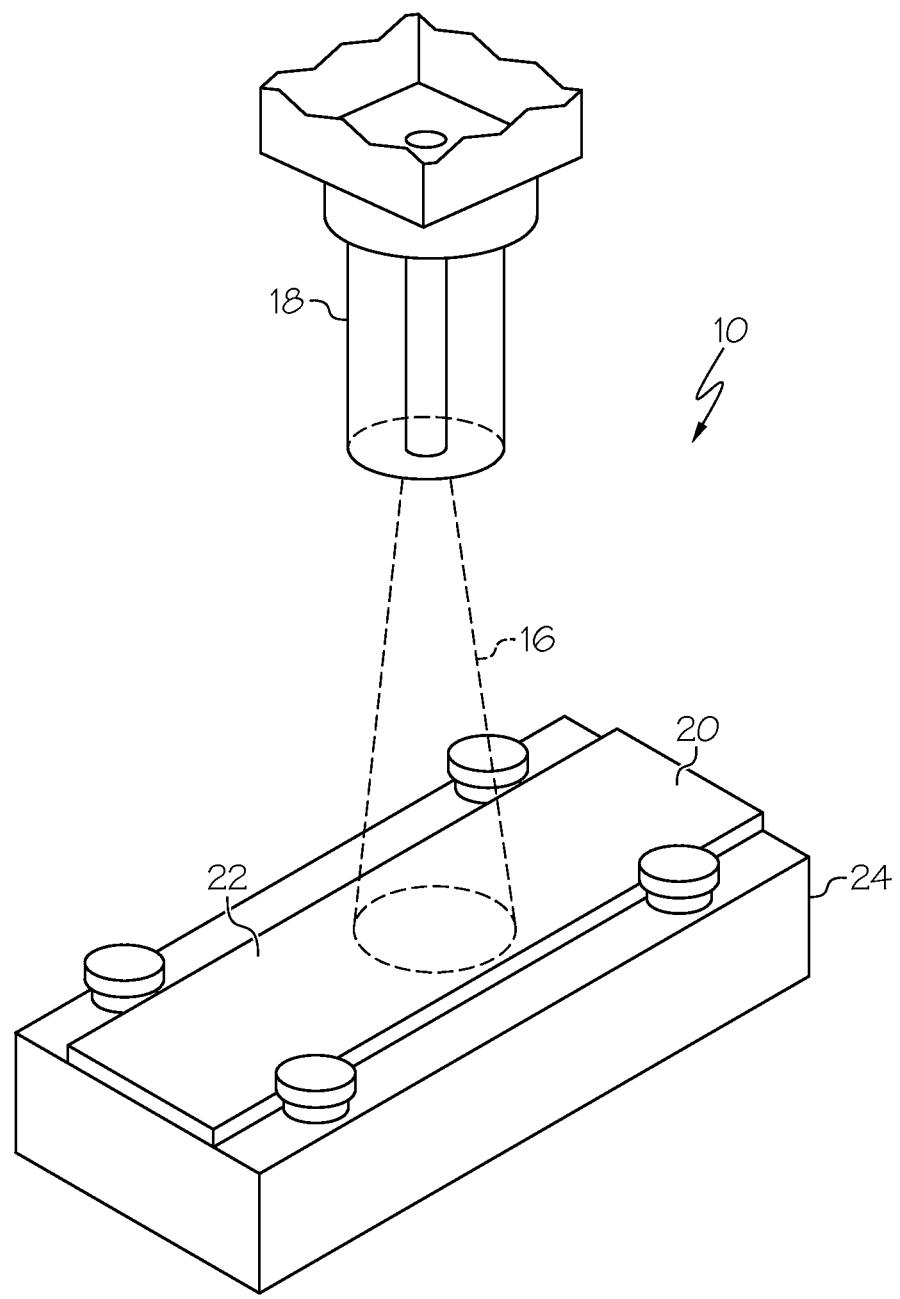
FIG. 2 is an illustration of the peening machine process applied to a surface of a plate coupon to form the coupon having residual stress uniformly induced along the coupon surface.
Figure 3:
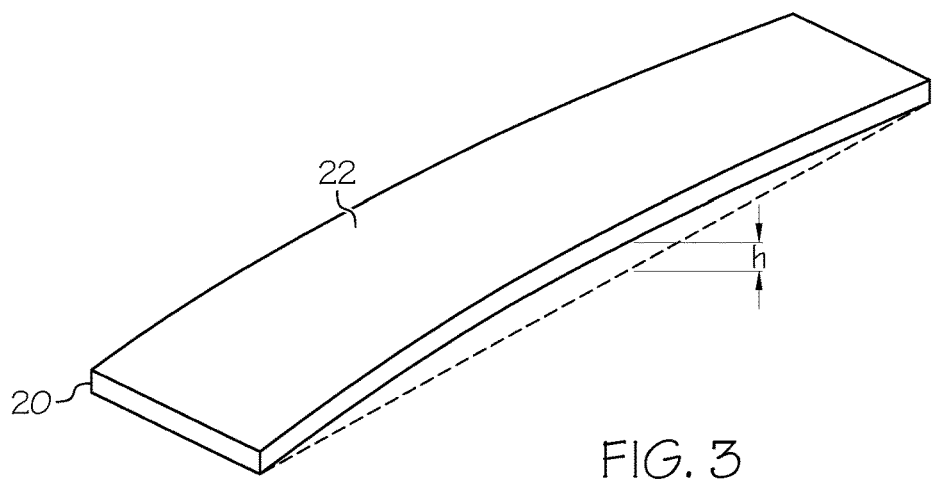
FIG. 3 is a perspective view of the coupon illustrating distortion induced by residual stress.
Figure 4:
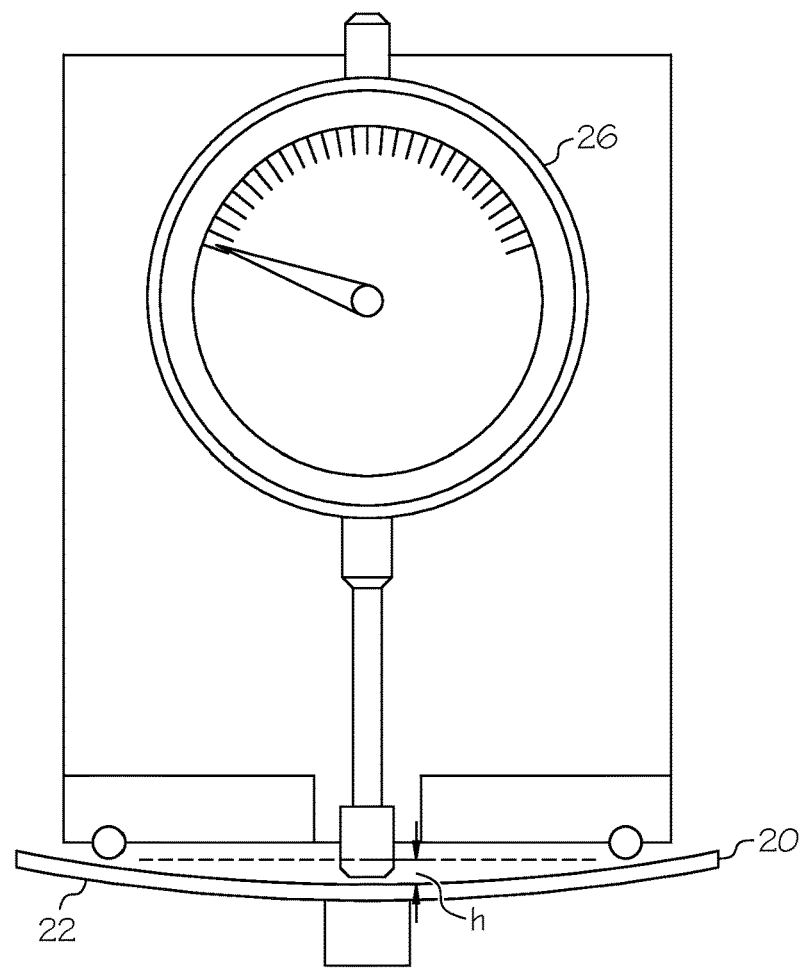
FIG. 4 is an illustration of the coupon of FIG. 2 mounted to a measuring device illustrating displacement measurement.

Referring to FIGS. 2-4, the shot peening machine process 10 may utilize a plate coupon 20 (e.g., Almen strip) method to describe the intensity of the peening process. The Almen strip method may quantify all factors affecting the intensity of the shot peening treatment of the workpiece 12. As illustrated in FIG. 2, the shot peening process 10 may be applied to one surface 22 of opposing surfaces of the plate coupon 20 to induce residual stresses uniformly along the surface 22 of the coupon 20. The flat metal plate coupon 20 may be clamped to a test block 24 and blasted with shot 16 (e.g., from a blast nozzle 18).

As illustrated in FIG. 3, due to compression of the surface layer of only the peened surface 22, the residual surface compressive stresses may make the coupon 20 bow upward in the middle when released from the test block 24. The height h of this bowed arc may be measured, such as by a measuring device 26 (e.g., Almen Gauge) (FIG. 4). The height h may be an index of the intensity of the peening. The height h of the arc may be dependent upon the degree of compressive residual stress 28 (FIG. 5) and may be a measure of the intensity of the shot peening process 10. The degree of curvature (e.g., arc height h) may depend on the properties of the shot blast, the properties of the coupon 20, and the nature of exposure.

Referring to FIG. 5, the coupon 20 must be exposed to the peening process 10 for an adequate time in order for saturation to occur. Saturation may be determined by exposing several coupons 20 to successively longer period of shot blasts. Graphing the results may allow for interpretation of the data and a reading of intensity can be obtained. Intensity may be defined as the first point on a curve that, if the exposure time is doubled, the arc height h increases by 10%. FIG. 5 illustrates a graph of arc heights achieved at increasing exposure times. The assumption made is that the curvature of the coupon 20 may indicate the degree of compressive residual stresses and, accordingly, the resistance to fatigue failure or of stress corrosion cracking.

Figure 8A:
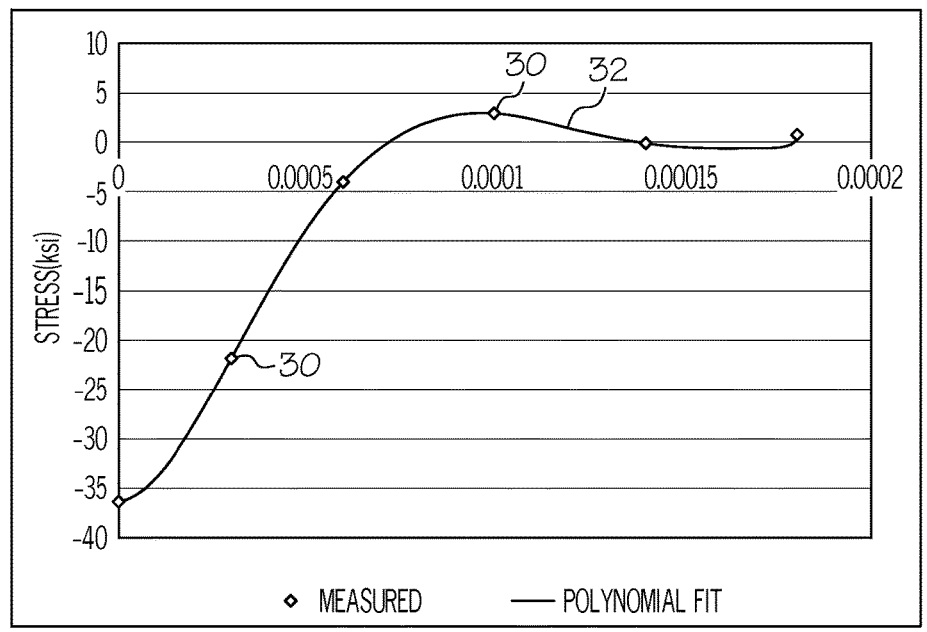
FIG. 8A is an illustration of an example curve shaped function comprising a least squares polynomial approximation of residual stress measurements induced in the coupon surface on the x-direction.
Figure 8B:
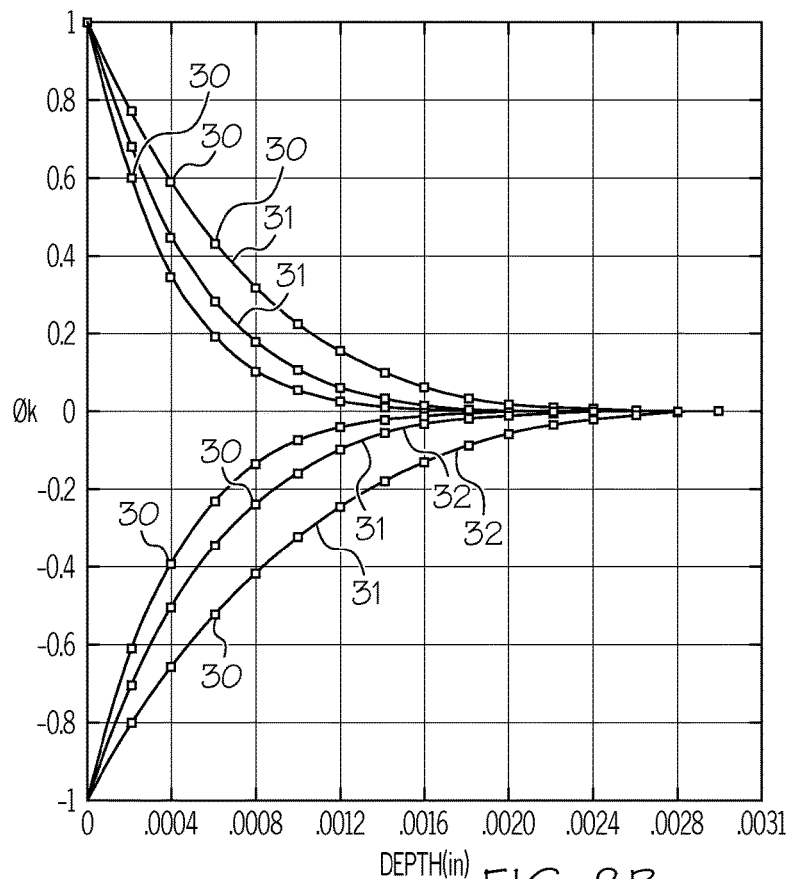
FIG. 8B is an illustration of example curve shaped functions comprising least squares polynomial approximations of residual stress measurement induced in the coupon surface on the x, y, and xy-directions.

Referring to FIG. 6, the induced residual stress 28 may be measured in each one of an x-direction, a y-direction, and an xy-direction. Measurements of induced stress 30 may be performed by any suitable technique including, but not limited to, x-ray diffraction. The induced residual stress measurements 30 (e.g., in the x, y, and/or xy-directions) may be fitted to a curved shape function 32 (e.g., a shape approximating a curve) as shown in FIGS. 8A and 8B. It can be appreciated that FIG. 8A illustrates an example of the induced residual stress measurements 30 fit to curved shape function 32 corresponding to stress components on the x-direction and that FIG. 8B illustrates a similar example of the induced residual stress measurements 30 fit to curved shape functions 32 corresponding to stress components on the x-direction, y-direction, and xy-direction. The curve shaped function 32 may be a least squares polynomial approximation of residual stress measurements 30 induced in the coupon surface 22 by the shot peening process 10 (FIG. 1).

Figure 9:
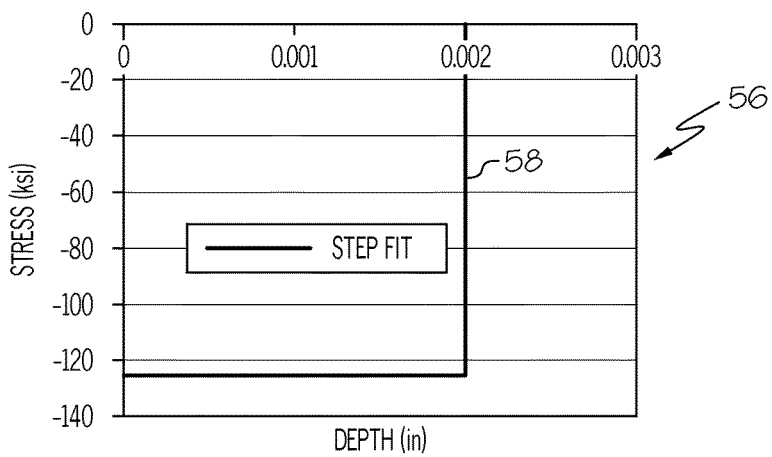
FIG. 9 is an illustration of an example graph of a calibrated step test function.
Figure 10:
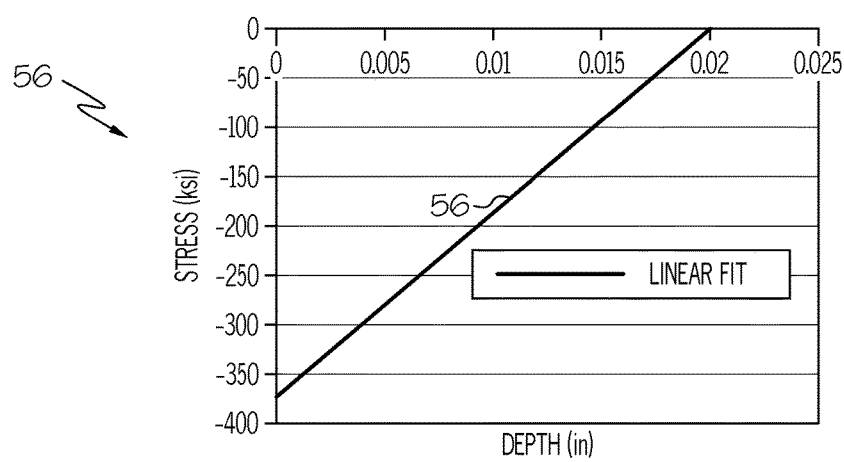
FIG. 10 is an illustration of an example graph of a calibrated linear test function.
Figure 11:
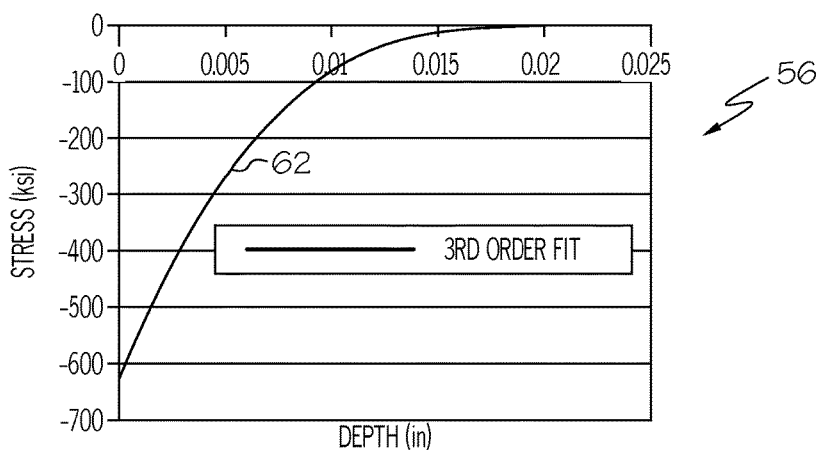
FIG. 11 is an illustration of an example graph of a calibrated third order polynomial test function.

As described in greater detail below, a moment coefficient $C_M$ may be calculated for each one of the x-direction, y-direction, and xy-direction (FIG. 6) based on the fitted induced residual stress measurements 31 (FIG. 8B). The moment coefficient $C_M$ may be used to calibrate any suitable stress function 34, without limitation, such as a step function (FIG. 9), a linear function (FIG. 10), and a $3^{rd}$ order term function (FIG. 11). The stress function 34 may be applied to a finite element model 38 (FIG. 25) of the workpiece 12 (FIG. 24) for predicting distortion and/or residual stress in the workpiece 12 resulting from the application of the peening process 10 (FIG. 1). The peening process 10 may be altered based upon the predicted distortion or predicted residual stress in the workpiece 12. For example, the shot peening process 10 may be altered to reduce the residual stress magnitude in the surface 14 of the workpiece 12 and/or to induce the formation of residual stresses that are predominately compressive to enhance fatigue life and minimize crack growth.

The present disclosure is based on the premise that: (1) the linear theory of elasticity is a good approximation for the computation of distortion caused by the shot peening process 10 (FIG. 1) (e.g., the material is linearly elastic and remains linearly elastic after the surface process); (2) the total strains left on the material (e.g., workpiece 12) after the machining are produced by the last machining sequence (e.g., the strains introduced by any machining sequence are contained in a relatively small, or shallow, layer (e.g., 0.020 inch), which is removed and recreated by the subsequent machining sequence; (3) providing there is enough elastic material after machining, and the same parameters (e.g., tool, machining settings, and tool path) are used in the same material, the machining induced strains will be always the same (e.g., invariance of the machining process is assumed, any difference between two identically machined coupons will be caused by variation on the above parameters); and (4) local variations with respect to the statistical mean of the strains induced on the machined surface will cause local variations in the residual stress and distortion of a component, therefore if these variation are negligible, the mean of the strains induced on the machined surface can be used to predict the distortion and residual stress of a machined component.

Additionally, the present disclosure is based on the premise that: (1) the surface process induced strains are only a function of the processed surface normal; and, (2) any other source of residual stress (e.g., material residual stress) is considered negligible, however in cases where material stresses cannon be neglected, those material stresses may be incorporated assuming linear superposition.

Thus, distortion resulting from peening-induced residual stress 28 (FIG. 6) can be determined from the resultant or integral average of the through-thickness residual strain distribution. Based upon the foregoing, localized variations in strain distribution may be ignored and any function that represents through-thickness residual strain distribution in a component can be used to represent residual strain provided that: (1) the resultant of the function has the same magnitude (e.g., is statically equivalent) to the actual (e.g., measured) residual strain and, (2) the depth over which the residual stress is integrated is greater than the depth at which the residual strain diminishes to zero.

Figure 12:
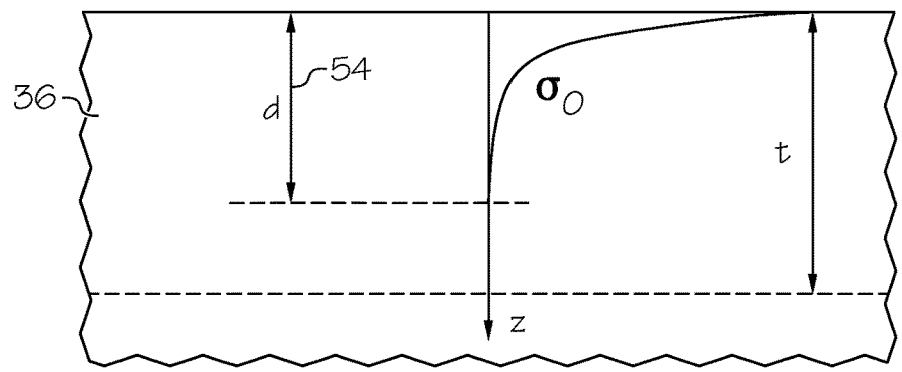
FIG. 12 is a cross-sectional schematic illustration of a residual stress distribution in a semi-infinite plate.

Referring to FIG. 12, illustrating a semi-infinite plate 36 having received a surface process treatment (e.g., shot peening 10) on its entire surface. The entire surface may be treated by the same process (e.g., peening process 10) having set machining parameters and machining path. All of the strain components (e.g., perpendicular to the plate normal) may be converted to stresses (e.g., any stress distribution may be equilibrated)

Residual strain within the semi-infinite plate 34 may be interchanged with residual stress because the distribution of residual strain and residual stress will equilibrate over the infinite length and width of the plate 36. In this regard, the resultant of the integral average of the through-thickness residual strain distribution may be determined by using EQ-10 below, which may be interpreted as the integral equation for defining the resultant force $C_F$ of the residual stress distribution at a given depth (i.e., the force resultant per unit length over the thickness of the sub-domain is equal to a constant):

$$\int_0^t \sigma_0 dz = C_F \qquad \text{(EQ-10)}$$

wherein $\sigma_0$ represents the residual stress distribution, z represents the thickness direction, and t represents the depth along which the residual stress is integrated. Likewise, EQ-20 below may be interpreted as the integral equation for defining the resultant moment $C_M$ of the residual stress distribution at a given depth (i.e., the moment resultant per unit length over the thickness of the sub-domain is equal to a constant):

$$\int_0^t \sigma_0(z-t/2)dz = C_M \quad (\text{EQ-20})$$

Figure 13:
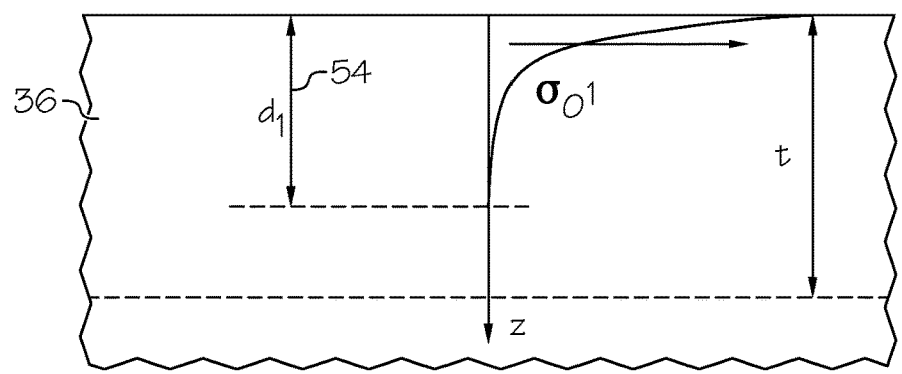
FIG. 13 is a cross-sectional schematic illustration of a first residual stress distribution in a semi-infinite plate.
Figure 14:
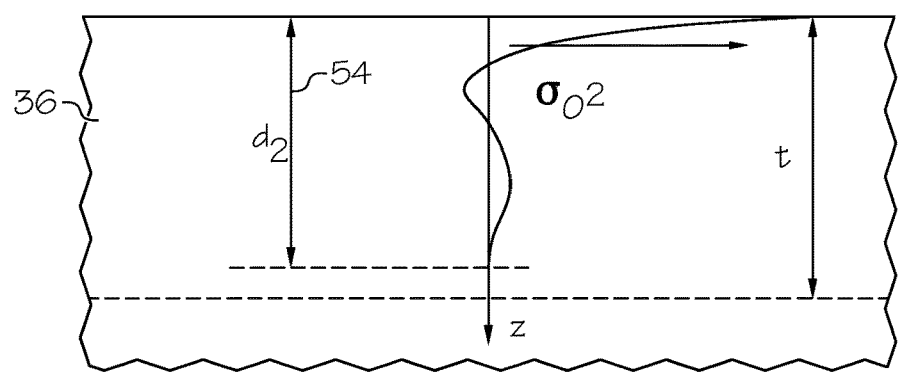
FIG. 14 is a cross-sectional schematic illustration of a second residual stress distribution in a semi-infinite plate.

Referring to FIGS. 13 and 14, illustrating two statically equivalent residual stress distributions $\sigma_0^1$ and $\sigma_0^2$ on the sub-surface of the semi-infinite plate 36. $\sigma_0^1$ may diminish to zero at $d_1$ and $\sigma_0^2$ may diminish to zero at $d_2$, when t is greater than or equal to the maximum of $d_1$ or $d_2$, respectively. Shown are schematic illustrations of a first residual stress distribution $\sigma_0^1$ and a second residual stress distribution $\sigma_0^2$ in a semi-infinite plate 36 having a finite thickness (or depth) and an infinite length and/or width. The residual stress distributions $\sigma_0^1$ and $\sigma_0^2$ illustrated in FIGS. 13 and 14 are non-limiting examples of a variety of alternative residual stress distributions that may result from the performance of one or more shot peening operations on a surface 14 (FIG. 5).

FIG. 13 illustrates a residual stress distributions $\sigma_0^1$ that may be tensile in nature with the greatest magnitude at the surface 14 (FIG. 1) and decaying to zero at $d_1$. In contrast, FIG. 14 illustrates a residual stress distribution $\sigma_0^2$ that may be a combination of tensile and compressive in nature and which extends to a greater depth $d_2$ relative to the depth $d_1$ (FIG. 12). It can be seen in FIGS. 13 and 14 that the thickness t is greater than the maximum of $d_1$ and $d_2$, such that the magnitude of the resultant force of the stress distributions $\sigma_0^1$ and $\sigma_0^2$ may be substantially equivalent for any depth t that is greater than the maximum of $d_1$ and $d_2$, as illustrated below in EQ-30. Likewise, the magnitude of the resultant moment of the stress distributions $\sigma_0^1$ and $\sigma_0^2$ may be substantially equivalent for any depth t that is greater than the maximum of $d_1$ and $d_2$, as illustrated below in EQ-40.

$$\int_0^t \sigma_0^1 dz = \int_0^t \sigma_0^2 dz = C_F \quad (\text{EQ-30})$$

$$\int_0^t \sigma_0^1(z-t/2)dz = \int_0^t \sigma_0^2(z-t/2)dz = C_M \quad (\text{EQ-40})$$

Therefore, the stress resultants, computed by EQ-30 and EQ-40, may yield the same values provided the integration interval (e.g., [0,t]) includes the region where the stress magnitude decays to zero for both distributions. It follows that, if the constants $C_F$ and $C_M$ (e.g., for each component of the stress tensor) are known, then any function that yields the same values can be used to predict the distortion of machined components (e.g., workpiece 12), provided the thickness of the component is larger than the depth at which the stress distributions become zero.

Figure 15:
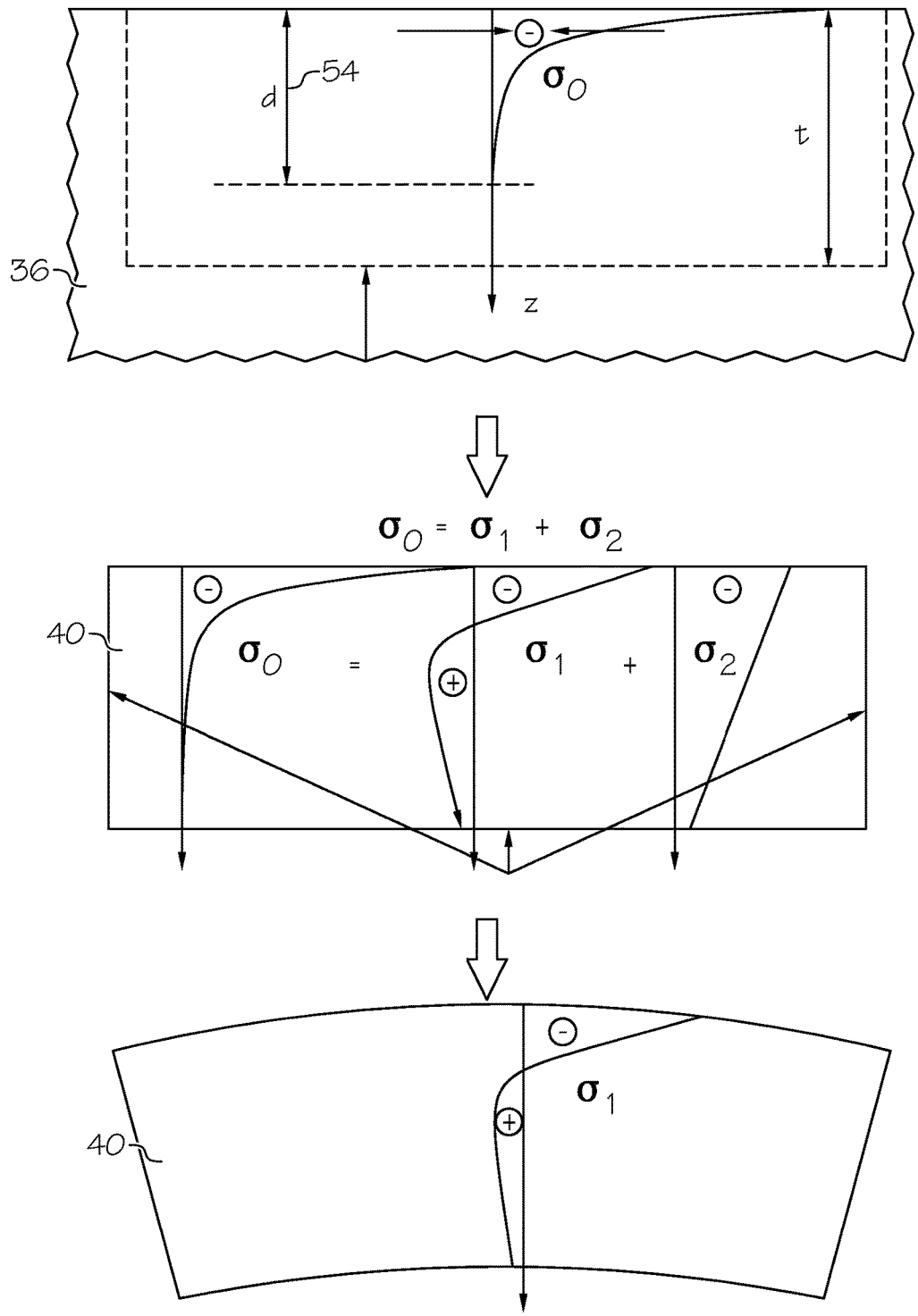
FIG. 15 is schematic illustration of the redistribution of residual stresses on a finite sample taken from the semi-infinite plate of FIG. 12.

Referring to FIG. 15, the redistribution of residual stresses on a finite sample 40 taken from the semi-infinite plate 36 may be represented schematically. If a finite sub-domain is removed from the semi-infinite plate 36 as a finite sample 40, the stress may redistribute and the sample 40 may distort. The components of stresses that do not satisfy equilibrium within the sub-domain may be responsible for distortion, while the other components remain as new residual stress distribution in the sample 40. As illustrated, $\sigma_0 = \sigma_1 + \sigma_2$. The new surfaces of the sample 40 may satisfy a stress free surface boundary condition.

If two statically equivalent initial stress distributions are considered, then the distortion caused by redistribution of these stresses after removing a finite sample 40 (FIG. 15) may be the same everywhere except at the close vicinity of the free ends. The self-equilibrated portion of the stresses may cause the differences of distortion at the close vicinity of the free surfaces. Therefore the differences may be negligibly small considering that they have zero resultants and their effects decay exponentially with the distance from the boundary (e.g., by the Saint-Venant's principle).

An arbitrary stress distribution may be created to predict distortion, provided the arbitrary stress distribution is statically equivalent to the original stress distribution in the infinite plate 36 (FIG. 12). Since the material affected by the peening process 10 (FIG. 1) is concentrated in a relatively small layer, this method may be used to predict the distortion for complex geometries. Given the assumption that the strains induced by the peening process 10 are invariants, a specimen with a relatively simple geometry (e.g., plate coupon 20) may be selected to calibrate an arbitrary stress distribution.

One skilled in the art can appreciate that the disclosed method may be extended to any surface process that affects the material on a small layer, provided the assumption of the process being invariant holds. One skilled in the art can also appreciate that if the exact initial stress/strain distribution is known, then both the distortion and the resultant residual stress field on complex geometries may be predicted.

Figure 16:
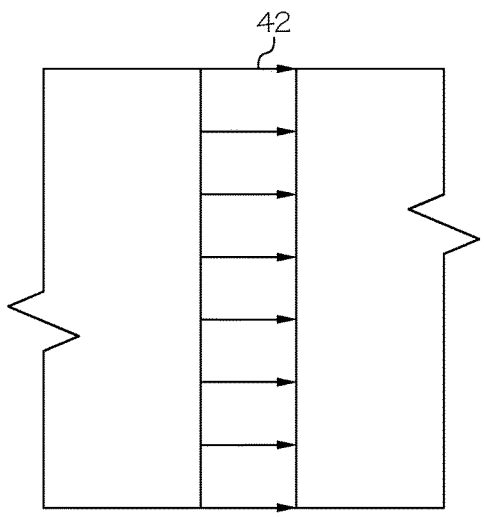
FIG. 16 is a schematic illustration of a linear plate extension function comprised of a either tensile residual stress or compressive residual stress.
Figure 17:
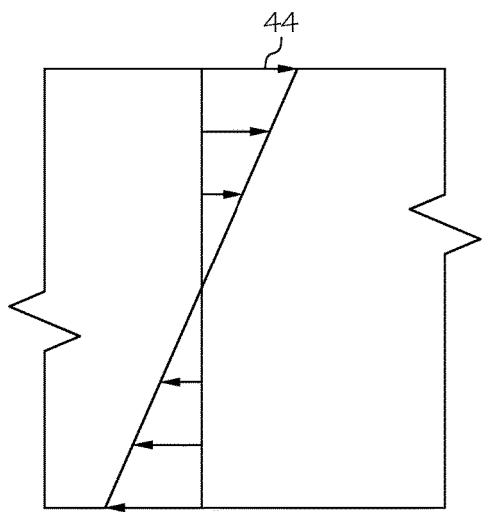
FIG. 17 is a schematic illustration of a linear plate bending function comprised of a gradient of tensile residual stress and compressive residual stress.
Figure 18:
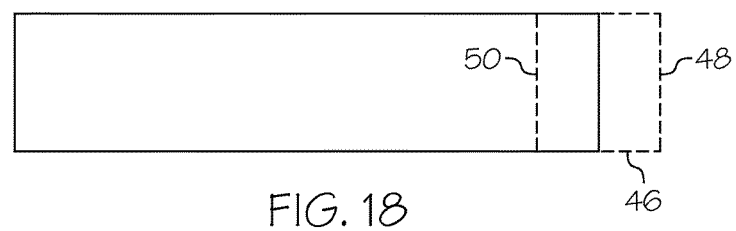
FIG. 18 is a schematic illustration of in-plane extension or contraction of a plate as a result of the application of the linear plate extension function of FIG. 16.
Figure 19:
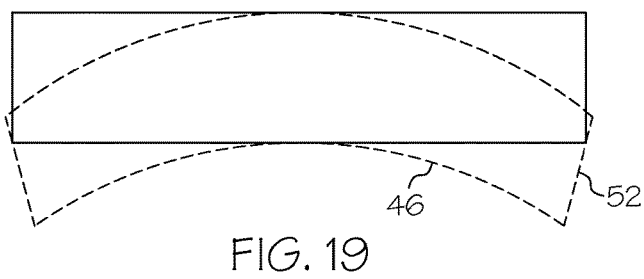
FIG. 19 is a schematic illustration of out-of-plane bending of a plate as a result of the application of the linear plate bending function of FIG. 17.

Referring to FIGS. 16-19, illustrating linear, through-thickness stress functions distortions 42, 44 of arbitrary plates subjected to the stress functions 42, 44 in FIGS. 16 and 17 and the respective distortions 46 of arbitrary plates subjected to the stress functions 42, 44 as shown in FIGS. 18 and 19. FIG. 16 is a schematic illustration of a linear plate extension function 42 comprised entirely of tensile (or entirely of compressive) residual stress. As can be seen in FIG. 18, the linear plate extension function 42 may result in in-plane expansion 48 (e.g., tensile residual stress) or in-plane contraction 50 (e.g., compressive residual stress) of the plate. FIG. 17 is a schematic illustration of a linear plate bending function 44 comprised of a gradient of tensile and compressive residual stress. In FIG. 19, the linear plate bending function 44 may result in out-of-plane bending 52 of the arbitrary plate. The linear stress functions 42, 44 illustrated in FIGS. 16 and 17 are basic examples of residual stress distributions for which a moment coefficient $C_M$ may be calculated and for which a stress function may be calibrated in a manner described in greater detail below.

Figure 20:
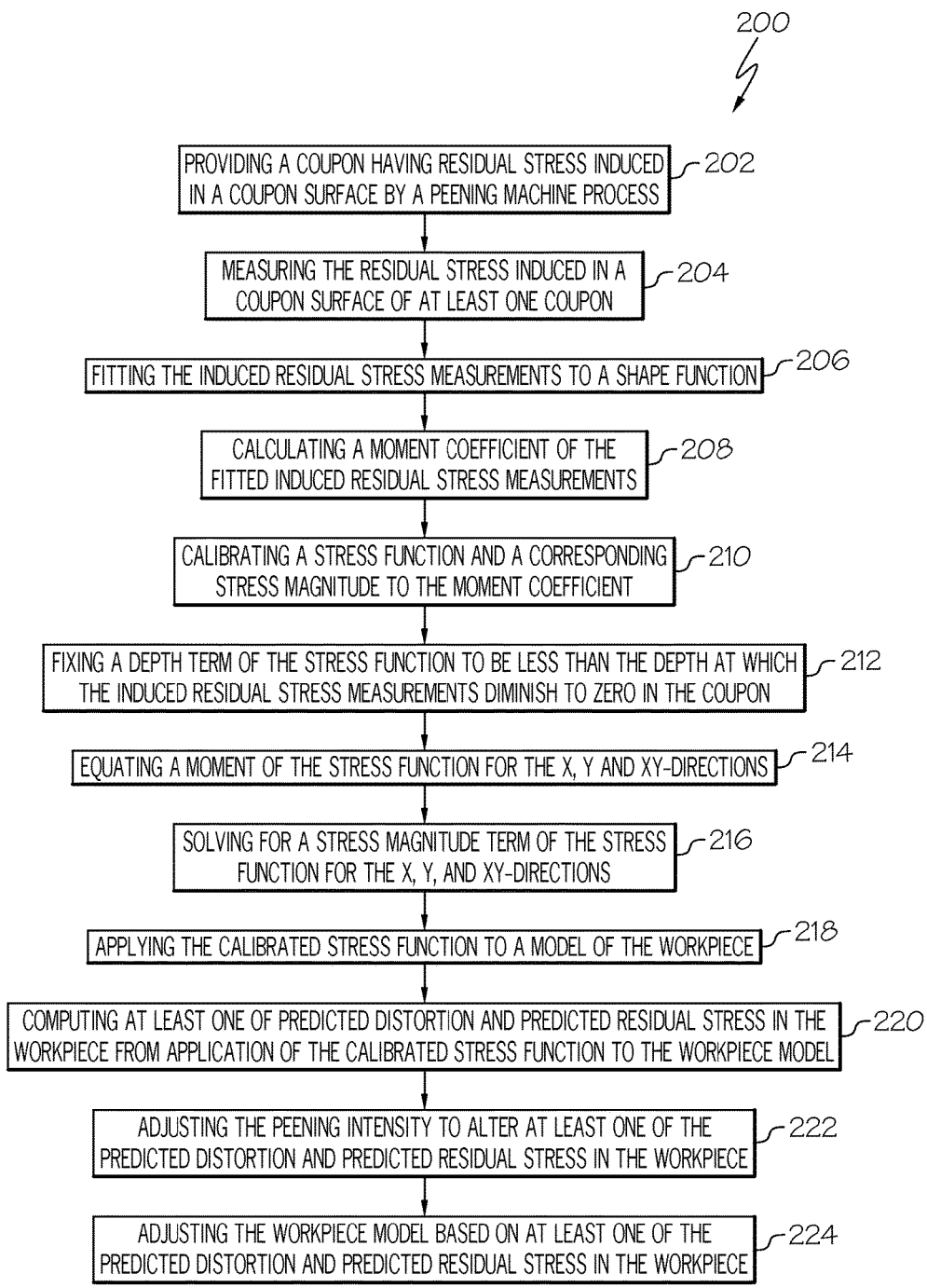
FIG. 20 is flow diagram of an embodiment of the disclosed method for predicting distortion in a workpiece by calculating a moment coefficient characterizing a selected peening intensity of the peening process performed on the workpiece.

Referring to FIG. 20, also disclosed is one embodiment of a method, generally designated 200, for predicting distortion in a workpiece 12 (FIG. 1) manufactured using a shot peening process 10 (FIG. 1).

As shown at block 202, the method may include the step of providing a plate coupon 20 (FIG. 6) having residual stress induced in at leas one opposing coupon surfaces 22 (FIG. 2) by the peening process 10 (FIG. 1).

Figure 21:
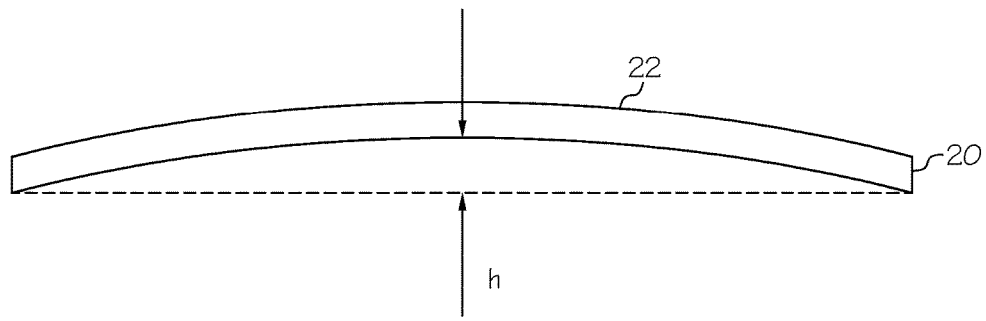
FIG. 21 is a side elevational view of an embodiment of the coupon illustrating distortion induced by residual stress.
Figure 22:
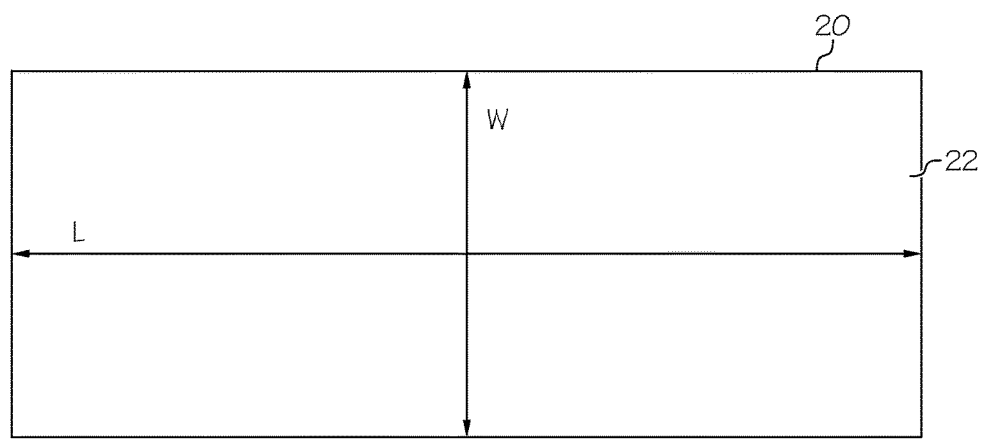
FIG. 22 is a top plan view of the coupon.
Figure 23:
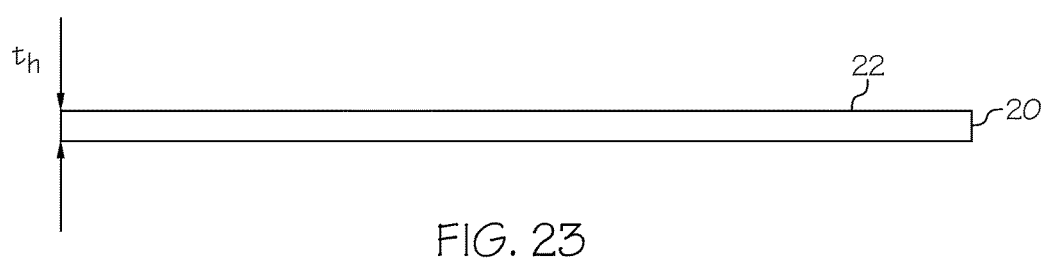
FIG. 23 is a side elevational view of the coupon.

Referring to FIGS. 21-23, the coupon 20 may have a generally thin orthogonal (e.g., rectangular) shape and may be generally flat or planar having a length dimension L and a width dimension W. In an embodiment, the thickness $t_h$ of the coupon 10 may be in the range from approximately 0.02 inch to approximately 0.10 inch. In another embodiment, the coupon 20 may be an Almen strip having a thickness in the range from approximately 0.31 inch to approximately 0.0938 inch. However, the coupon 20 may be formed in any suitable size, shape, and configuration and is not limited to a thin, rectangular configuration. The coupon 20 may be formed of any suitable isotropic material such as any suitable metallic material. The material of the coupon 20 may be substantially similar in composition to the material composition of the workpiece 12 (FIG. 24) for which distortion is to be predicted. For example, the plate coupon 20 may be formed of titanium alloy, such as a Ti6A14V-alloy commonly used in aerospace application due to its low density and high tensile strength at elevated temperatures. However, the plate coupon may be formed of any material, without limitation.

As shown in FIG. 2, the peening process 10 may be applied to one of the opposing surfaces 22 of the coupon 20 such that through-thickness residual stress is uniformly induced across the length L and width W (FIG. 22) of the coupon surface 22. The peening process 10 may form a residual stress layer 54 within the coupon surface 22 (FIG. 6) immediately adjacent to an outer surface of the coupon 20. The residual stress layer 54 is identified as having a depth d (FIG. 6), which is the distance from the coupon surface 22 at which the residual stress diminishes to zero.

The induced residual stress 28 in the residual stress layer 54 may be characterized in the x-direction, the y-direction, and the xy-direction in alignment with a Cartesian coordinate system where the x and y directions are in-plane and the z-direction is the thickness $t_h$ direction of the coupon 20. However, the Cartesian coordinate system illustrated in the present disclosure is representative of one of a variety of alternative system that may be implemented for characterizing the orientation of the induced residual stress 18 relative to the place of the coupon surface 22.

Referring again to FIG. 20, as shown at block 204, the method may include the step of measuring the induced residual stress 28 in the coupon surface 22 of at least one coupon 20 (FIG. 6) along at least one of the x-direction, the y-direction, and the xy-direction (FIG. 6). Measured parameters may include the magnitude of the induced residual stress 28 at different depths of the coupon 20 and the relative orientation (e.g., tension or compression) of the induced residual stress 28 at different depths d. Measurements of the induced residual stress 28 may be performed using any suitable stress measurement technique including, but not limited to, x-ray diffraction, neutron diffraction, laser interferometry, speckle interferometry, ultrasonic imaging, magnetic resonance imaging, and coupon boring, and sectioning or dissection of the coupon 20 with simultaneous strain measurement using strategically located strain gauges.

As shown at block 206, the method may include the step of fitting the induced stress measurements 30 (FIGS. 8A and 8B) for each one of the x, y, and/or xy-directions to a curve shaped function 32 representing the distribution of the measured residual stress in each of the x, y, and/or xy-directions. For example, FIG. 8 illustrates a least squares polynomial approximation of the induced residual stress measurements 30 fitted using EQ-50, shown below:

$$\sigma = \Sigma_{k=1}^{N} A_k \phi_k = \Sigma_{k=1}^{N} A_k [(z-z_0)/z_0]^{k+2} \quad (EQ\text{-}50)$$

wherein σ represents the residual stress fitted using the polynomial approximation for k=1 to N terms, $\phi_k$ represents a general shape function selected here as the polynomial function $[(z-z_0)/z_0]k+2$, $A_k$ represents a constant fitting coefficient of the displacement curve shape functions, z represents a variable depth of the plate coupon 20 (FIG. 6), and $z_0$ represents a maximum depth at which the induced stress 28 is measured using the chosen measurement technique (e.g., x-ray diffraction). The fitted polynomial approximation illustrated in FIG. 8 may represent the actual induced residual strain distribution in the coupon 20.

As shown at block 208, the moment coefficient $C_M$ for each one of the x, y, and/or xy-directions may be calculated from the fitted (e.g., polynomial approximation) induced residual stress measurements 30 (FIG. 8B) for each one of the x, y, and/or xy-directions by substituting the above equation EQ-50 for σ residual stress into equations EQ-10 and EQ-20 representing the resultant force and resultant moment, respectively, of residual stress distribution. The resulting equations EQ-60 and EQ-70 for respectively calculating the force coefficient $C_F$ and the moment coefficient $C_M$ from the polynomial fit (FIG. 8B) are as follows:

$$C_F = \Sigma_{k=1}^{N} A_k \int_0^{Z_0} [(z-z_0)/z_0]^{k+2} dz \quad (EQ\text{-}60)$$

$$C_M = \Sigma_{k=1}^{N} A_k \int_0^{Z_0} [(z-z_0)/z_0]^{k+2} [z-(t/2)] dz \quad (EQ\text{-}70)$$

Figure 24:
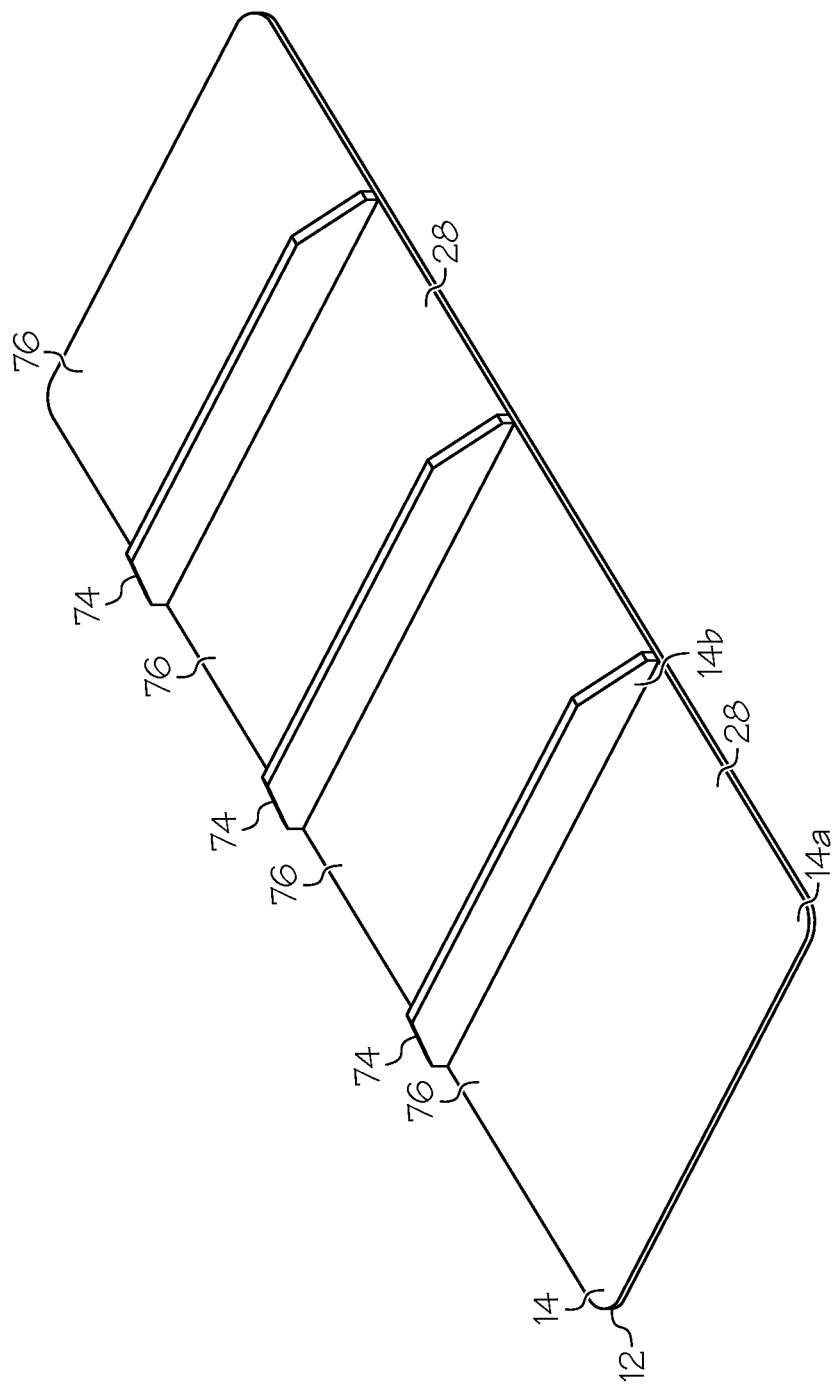
FIG. 24 is a perspective illustration of an embodiment of a workpiece and further illustrating the residual stress induced in a layer of the workpiece surface by the peening machine process.
Figure 25:
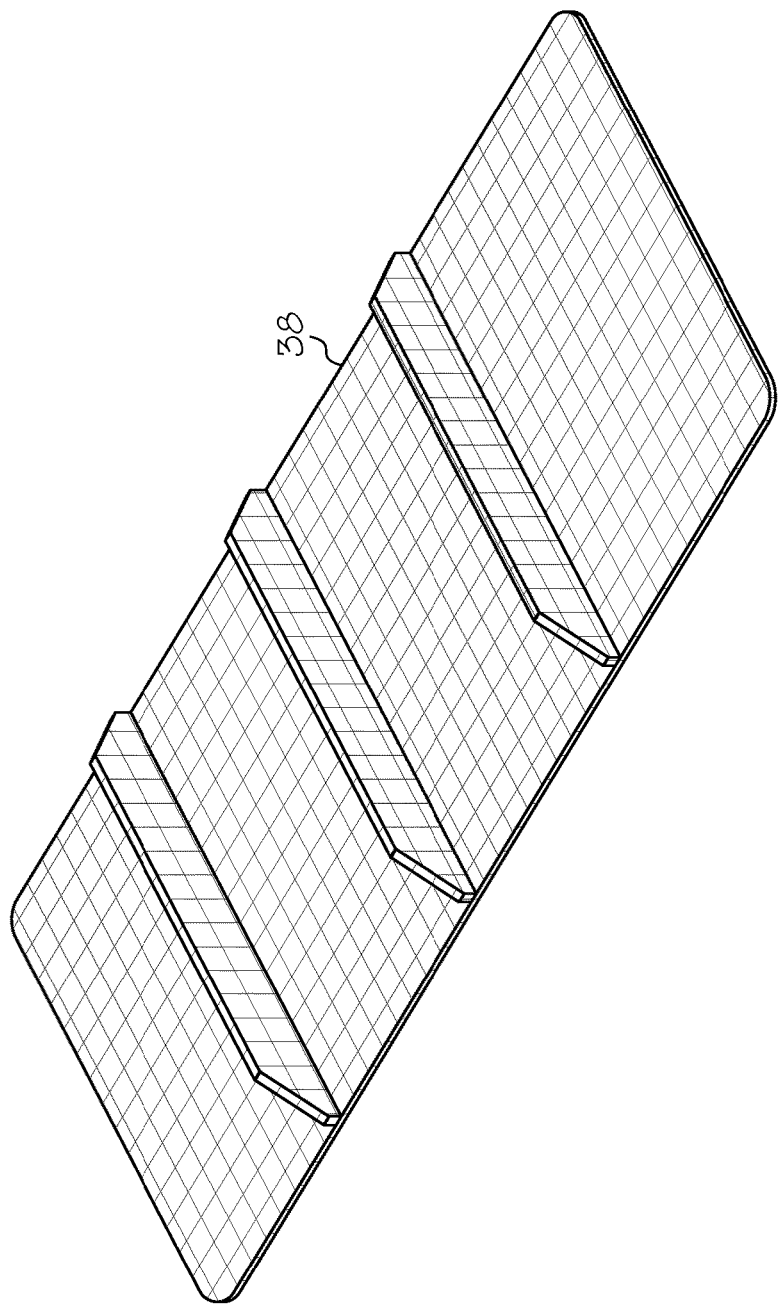
FIG. 25 is a perspective illustration of an embodiment of the finite element model of the workpiece of FIG. 24.

As shown at block 210, the method may include the step of calibrating a stress function (e.g., of residual stress) to the moment coefficient $C_M$. The calibrated stress function 56 (FIGS. 9-11) may be applied to a model 38 (FIG. 25) of the workpiece 12 (FIG. 24). The workpiece model 38 may include any suitable model for simulating the response of the workpiece 12 to the application of stress of loads on the workpiece 12. For example, the workpiece model 38 may include, without limitation, a finite element model (as illustrated in FIG. 25), a finite difference model, a finite volume model, or a plate equation of the workpiece 12.

The calibrated stress function 56 (e.g., FIGS. 9-11) may be applied to the workpiece model 38 (FIG. 25) for predicting distortion of the workpiece 12 (FIG. 24) and/or for predicting residual stress in the workpiece 12. The calibrated stress function 56 may include any suitable function for applying stress to the workpiece model 38. For example, the calibrated stress function 60 may include a step function 58 (FIG. 9), a linear function 60 (FIG. 10), or a $3^{rd}$ order term function 62 (FIG. 11). The calibrated stress function 56 may include a depth term and a stress magnitude term applied along the depth.

For the step function 58 (FIG. 9), the step of calibrating the stress function 56 to the moment coefficient $C_M$ (block 210) may include the step of fixing the depth term d of the step function 58 to be less than the depth at which the induced residual stress measurements 30 (FIG. 8B) (e.g., via x-ray diffraction) become insignificant or diminished to zero in the coupon 20 (FIG. 6), as shown at block 212. As shown at block 214, a moment of the step function 58 about the coupon neutral axis may be equated to the moment coefficient $C_M$. As shown at block 216, the stress magnitude term $S_{max}$ of the step function 58 may be solved for each of the x, y, and xy-directions. The stress magnitude $S_{max}$ may be calculated by solving the following equation EQ-80:

$$S_{max} = 2C_M/[d(d-t_h)] \quad (EQ\text{-}80)$$

wherein $C_M$ represents the moment coefficient, d represents the depth along which the stress magnitude $S_{max}$ acts, and $t_h$ represents the thickness of the coupon 20 (FIG. 6).

For the linear function 60 (FIG. 10), the step of calibrating the stress function 56 to the moment coefficient $C_M$ (block 210) may include the step of fixing the depth term d of the linear function 60 to be less than the depth at which the induced residual stress measurements 30 (FIG. 8B) become insignificant of diminished to zero in the coupon 20 (FIG. 6), as shown at block 212. As shown at block 214, a moment of the linear function 60 about the coupon neutral axis may be equated to the moment coefficient $C_M$. As shown at block 216, the stress magnitude tem $S_{max}$ of the linear function 60 may be solved for each of the x, y, and xy-directions. The stress magnitude $S_{max}$ may be calculated by solving for the following equation EQ-90:

$$S_{max} = 12C_M/[d(2d-3t_h)] \quad (EQ\text{-}90)$$

For the $3^{rd}$ order term function 62, the step of calibrating the stress function 56 to the moment coefficient $C_M$ (block 210) may include the step of fixing the depth term d of the $3^{rd}$ order function 62 to be less than the depth at which the induced residual stress measurements 30 (FIG. 8B) become insignificant of diminished to zero in the coupon 20 (FIG. 6), as shown at block 212. As shown at block 214, a moment of the $3^{rd}$ order term function 62 may be equated to the moment coefficient $C_M$. As shown at block 216, the stress magnitude tem $S_{max}$ of the $3^{rd}$ order term function 62 may be solved for each of the x, y, and xy-directions. The stress magnitude $S_{max}$ may be calculated by solving for the following equation EQ-100:

$$S_{max}=C_M/[(d^2/20)-(dt_h/8)] \tag{EQ-100}$$

As shown at block 218, the method may include the step of applying the calibrated stress function 56 (FIGS. 9-11) at corresponding calibrated stress magnitude (e.g., $S_{max}$ for the step function 58, linear function 60, or $3^{rd}$ order term function 62, respectively) and corresponding fixed depth (e.g., d) to the workpiece model 38 (FIG. 25). The calibrated stress function 56 may be applied to the workpiece model 38 in each of the x, y, and/or xy-directions.

Referring to FIGS. 26-31, shown are graphs illustrating the sensitivity of the calibrated stress magnitude $S_{max}$ for the calibrated step function 58 (FIG. 9) and the calibrated $3^{rd}$ order term function 62 (FIG. 11), relative to errors 64 in the moment coefficient $C_M$ for each one of the x, y, and/or xy-directions.

Figures 29, 30, 31:
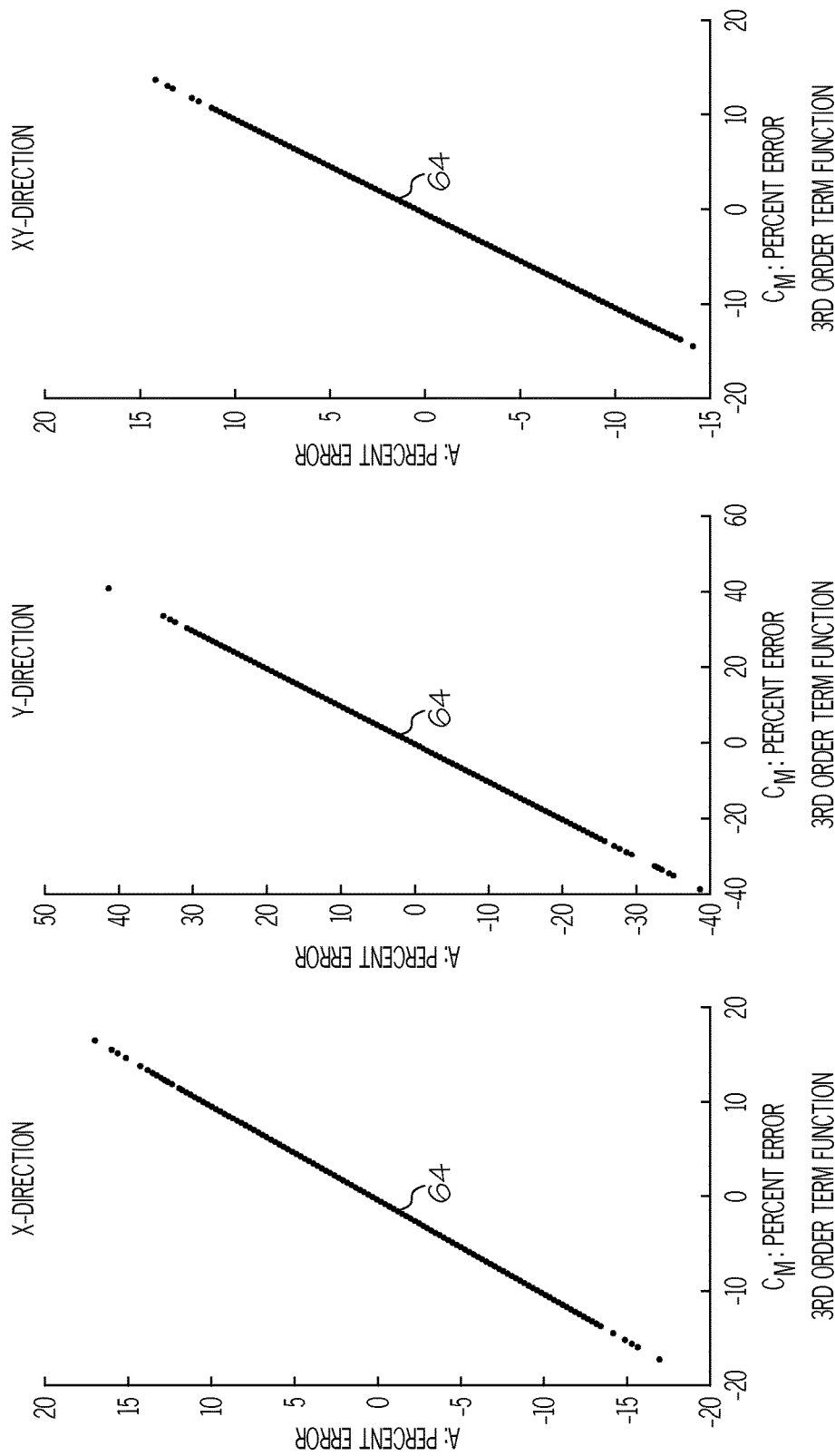
FIG. 29 is an illustration of a graph of moment coefficient relative error versus stress magnitude relative error of a $3^{rd}$ order term function calibrated to the moment coefficient for the x-direction.
FIG. 30 is an illustration of a graph of moment coefficient relative error versus stress magnitude relative error of a $3^{rd}$ order term function calibrated to the moment coefficient for the y-direction.
FIG. 31 is an illustration of a graph of moment coefficient relative error versus stress magnitude relative error of a $3^{rd}$ order term function calibrated to the moment coefficient for the xy-direction.

FIGS. 26-28 illustrate relative error in the moment coefficient $C_M$ plotted against relative error in the calibrated stress magnitude $S_{max}$ of the step function 58. The plotted errors in the moment coefficient $C_M$ are a result of errors artificially added to the induced residual stress measurements 30 (FIG. 8B) in the coupon 20 (FIG. 6) as measured by x-ray diffraction. Likewise, FIGS. 29-31 illustrate the relative error in the moment coefficient $C_A$/plotted against relative error in the calibrated stress magnitude $S_{max}$ of the $3^{rd}$ order term function 62 (FIG. 11) wherein the moment coefficient $C_M$ errors are the results of errors artificially added to the induced residual stress measurements 30 (FIG. 8B).

For the moment coefficient $C_M$ plotted in FIGS. 26-31, the magnitude of the error added to the induced residual stress measurements 30 in each of the x-direction (FIG. 8B), y-direction, and/or xy-direction was set to be no larger than five percent (5%) of the maximum out-of-plane displacement of the coupon 20 (FIG. 6) measured by x-ray diffraction. As can be seen in FIGS. 26-31, the relative error 64 propagation in the calibrated stress magnitude $S_{max}$ for the step function 60 and $3^{rd}$ order function 62 is linear relative to the errors in the moment coefficient $C_M$. Furthermore, it can be seen that the errors in the calibrated stress magnitude $S_{max}$ are on the same order of magnitude as the errors in the moment coefficients $C_M$.

Referring still to FIG. 20, as shown at block 220, the method may include the step of computing predicted distortion and/or predicted residual stress in the workpiece 12 (FIG. 24) resulting from application of the calibrated stress function 60 (FIGS. 9-11) to the workpiece model 38 (FIG. 25) at the calibrated stress magnitude and corresponding depth. Distortion and/or residual stress may be predicted in a workpiece 12 of any thickness. As indicated above, the calibrated stress function 56 represents the stress distribution profile in the through-thickness direction. The calibrated stress function 56 may be applied to the workpiece model 38 at the calibrated stress magnitude and corresponding depth.

Figure 32:
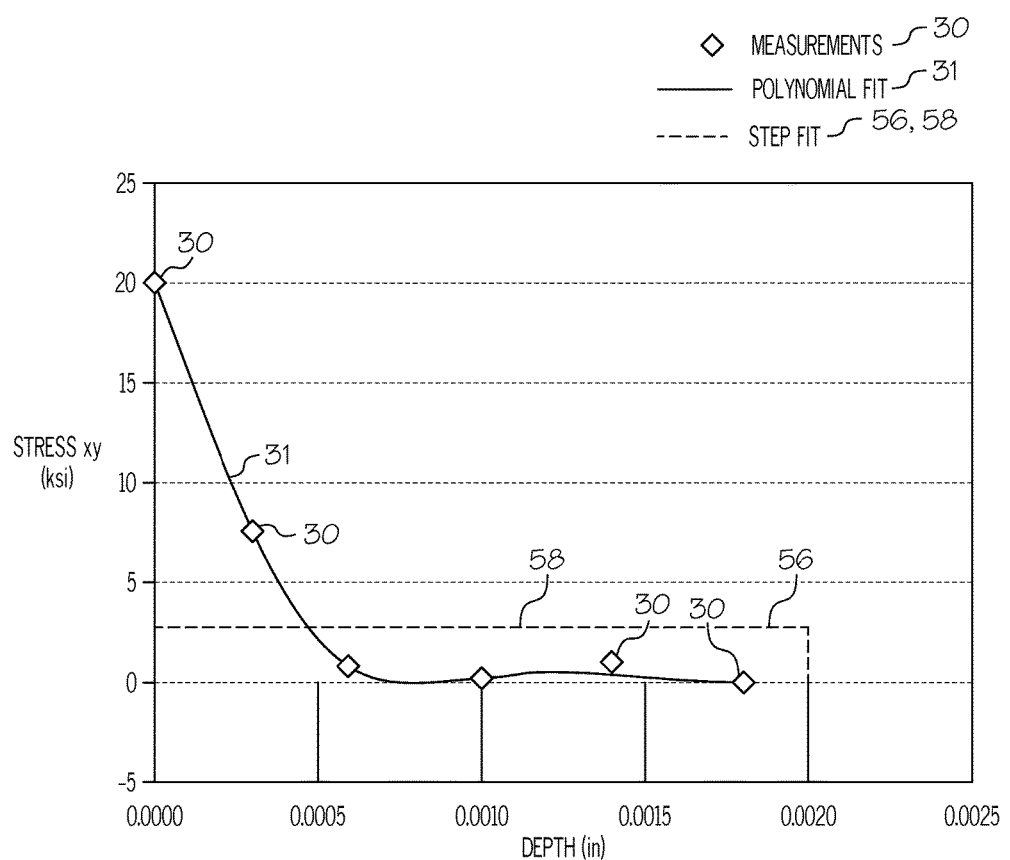
FIG. 32 is an illustration of an example graph of stress magnitude in the xy-direction versus depth and illustrating a polynomial fit of the induced residual stress measurements superimposed with a plot of the calibrated step function.

Referring to FIG. 32, illustrating an example graph of calibrated stress magnitude $S_{max}$ of a step function 58 in the xy-direction versus depth d. The plot of the calibrated step function 58 is superimposed over a plot of a polynomial fit of the induced residual stress measurements 30 for a coupon 20 (FIG. 6) having a thickness of about 0.040 inch. In FIG. 32, the stress magnitude $S_{max}$ of the step function 62 for fixed depth d of 0.002 inch is calibrated to be substantially equivalent to the moment coefficient $C_M$. As discussed above, the moment coefficient $C_M$ is the moment resultant of the through-thickness residual stress distribution that is represented in FIG. 32 by the polynomial fit of the induced residual stress measurements 30 in the xy-direction.

Figures 33, 34:
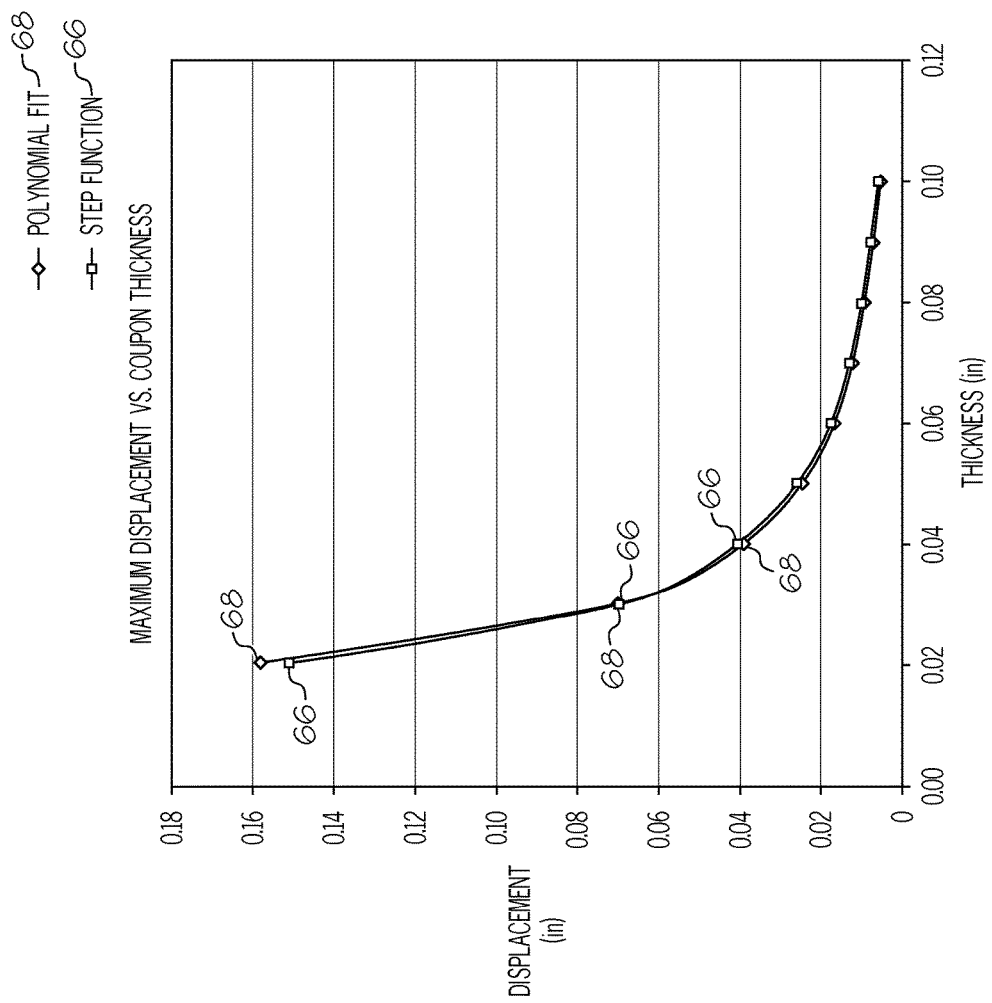
FIG. 33 is an illustration of an example graph of error of the step function in predicting displacement of a workpiece.
FIG. 34 is an illustration of a table of different workpiece thicknesses and associated displacement errors of workpieces subjected to the calibrated step function illustrated in FIG. 33.

Referring to FIG. 33, illustrating an example graph of the accuracy of the calibrated step function 58 in predicted out-of-plane displacement (e.g., bending) of a workpiece 12 (FIG. 24) in the xy-direction. More specifically, FIG. 33 is an illustration of a graph plotting predicted workpiece displacement versus workpiece thickness. The workpiece thicknesses range from 0.02 to 0.10 inch. Displacements were computed and the displacements 66 (e.g., step function) were plotted for different workpiece thicknesses subjected to the calibrated step function 58 stress magnitude $S_{max}$ along a depth d of 0.002 inch. Displacements were also computed and the displacements 68 (e.g., polynomial fit) were plotted in FIG. 33 for workpiece thicknesses subjected to the stress distribution profile (e.g., polynomial fit) of the induced residual stress measurements 30 from x-ray diffraction as shown in FIG. 32.

Referring to FIG. 34, illustrating an example table of the relative out-of-plane displacement error versus workpiece thicknesses as plotted in FIG. 33. More specifically, FIG. 34 illustrates the different workpiece thicknesses and the corresponding error in the predicted displacements 66 (FIG. 33) for workpieces subjected to the calibrated stress magnitude $S_{max}$ relative to the displacements 68 (FIG. 33) in the workpieces subjected to the induced residual stress measurements 30 from x-ray diffraction. It can be seen in FIG. 34 that the relative error 64 (FIGS. 26-28) in displacements is lowest for the case where the workpiece thickness is substantially equivalent to the coupon thickness (e.g., 0.04 inch) from which the induced residual stress measurements 30 were taken. The relative error 64 in displacement can be seen as increasing with increasing workpiece thickness. However, it can also be seen in FIG. 34 that the displacement error is relatively small (e.g., less than 5%) for workpiece thicknesses that differ from the coupon thickness by at least one half of the coupon thickness.

Figure 35:
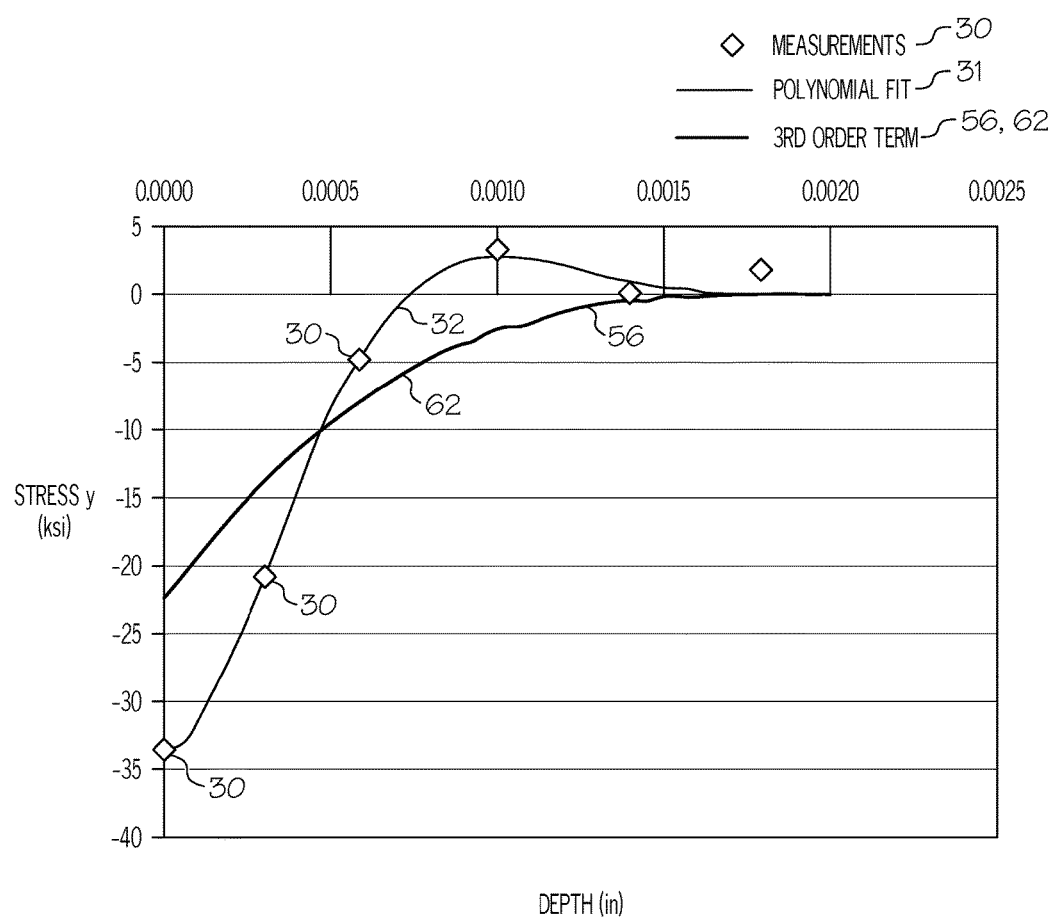
FIG. 35 is an illustration of an example graph of stress magnitude in the y-direction versus depth and illustrating a polynomial fit of the induced residual stress measurements superimposed with a plot of the calibrated $3^{rd}$ order term function.

Referring to FIG. 35, illustrating an example graph of calibrated stress magnitude $S_{max}$ in the y-direction versus depth d for a calibrated $3^{rd}$ order term function 62. The plot of the calibrated $3^{rd}$ order term function 62 is superimposed over a plot of the induced residual stress measurements 30 for a plate coupon 20 (FIG. 6) of 0.040 inch thickness. The stress magnitude $S_{max}$ of the $3^{rd}$ order term function 62 for fixed depth d of 0.002 inch is calibrated to be substantially equivalent to the moment coefficient $C_M$ computed from the induced residual stress measurements 30 as described above with regard to FIG. 8B.

Figures 36, 37:
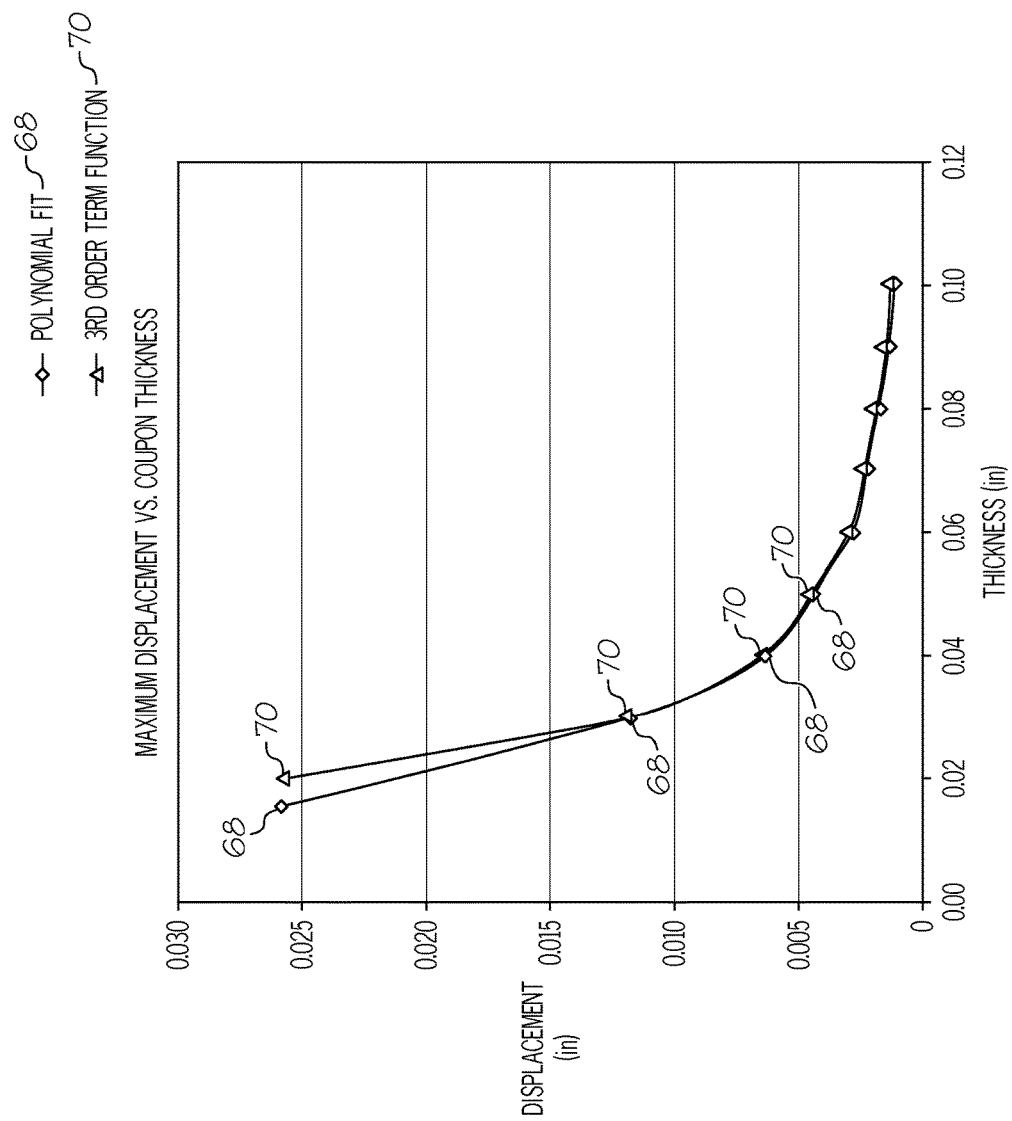
FIG. 36 is an illustration of an example graph of error of the $3^{rd}$ order term function in predicting displacement of a workpiece.
FIG. 37 is an illustration of a table of different workpiece thicknesses and associated displacement errors of workpieces subjected to the calibrated $3^{rd}$ order term function illustrated in FIG. 36.

Referring to FIG. 36, illustrating an example graph of the accuracy of the calibrated $3^{rd}$ order term function 62 in predicting out-of-plane displacement (e.g., bending) of a workpiece 12 (FIG. 24) in the y-direction. More specifically, FIG. 36 illustrates a plot of predicted workpiece displacement versus workpiece thickness. Displacements 70 (e.g., $3^{rd}$ order term function) were plotted for different thicknesses (e.g., 0.02 to 0.10 inch) of workpieces 12 subjected to the calibrated $3^{rd}$ order term function 62 stress magnitude $S_{max}$ along depth d of 0.002 inch as illustrated in FIG. 35.

Displacements 68 (e.g., polynomial fit) were also plotted for workpiece thicknesses subjected to the stress distribution profile of the induced residual stress measurements 30 from x-ray diffraction plotted in FIG. 35.

Referring to FIG. 37, illustrating an example table of relative out-of-plane displacement error versus workpiece thickness as plotted in FIG. 36. More specifically, FIG. 37 illustrates the error in predicted displacements 70 (FIG. 36) for different workpiece thicknesses subjected to the calibrated $3^{rd}$ order term function 62 (FIG. 35) stress magnitude Smax relative to the displacements 68 (FIG. 36) in workpieces subjected to the induced residual stress measurements 30 from x-ray diffraction. It can be seen in FIG. 37 that the displacement is lowest where the workpiece thickness is substantially equivalent to the coupon thickness (e.g., 0.040 inch) and that the displacement error is relatively small (e.g., less than 1%) for the workpiece thicknesses that differ from the coupon thickness by at least one half of the coupon thickness.

Figures 38, 39:
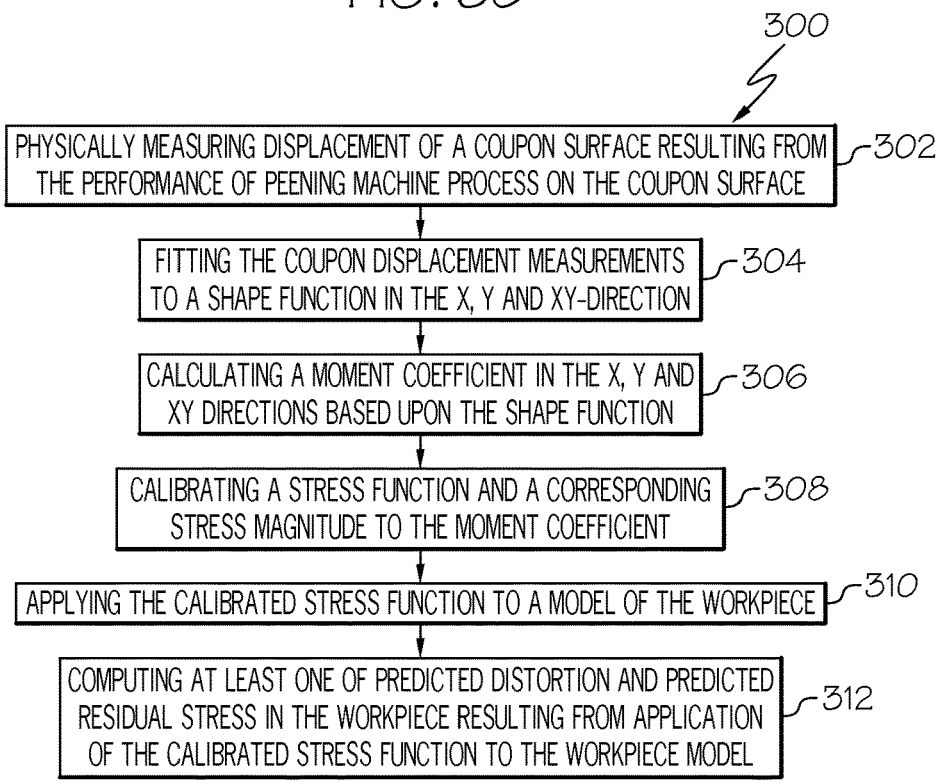
FIG. 38 is a table of depths and corresponding relative error between a force coefficient and the resultant of the actual residual stress distribution.
FIG. 39 is a flow diagram of an embodiment the disclosed method for predicting distortion in a workpiece wherein the moment coefficient is calculated using measurements of the coupon surface displacement resulting from the peening process performed on the workpiece.

Referring to FIG. 38, illustrating an example table of different depths along a stress distribution profile and the associated errors 72 in the calculated stress coefficient $C_F$ relative to the resultant of the actual stress at the given depths. As indicated above, the stress coefficient $C_F$ may be calculated by equation EQ-60 using the measured residual stress distribution in the coupon 20 (FIG. 6). The actual stress distribution is from the induced residual stress measurements 30 (FIGS. 8A and 8B) using any suitable residual stress measurement technique, such as x-ray diffraction. Although the stress coefficient $C_F$ is not equivalent to the resultant of the actual stress at a given depth, the relative error of the stress coefficient $C_F$ is relatively small for depths that are within the actual stress distribution profile. Furthermore, because in-plane displacement (e.g., expansion and contraction) is related to the stress coefficient $C_F$, relatively small errors in the stress coefficient $C_F$ correspond to relatively small errors in predicted in-plane displacement.

Referring again to FIG. 24, illustrating a non-limiting example of a workpiece 12 for which distortion and/or residual stress may be predicted based upon the calibrated stress function 56 (FIGS. 32, 35) that may be applied to the workpiece model 38 (FIG. 25). In the illustrated embodiment, the workpiece 12 may include a sample part made of a collection of ribs 74 and webs 76. The stress function 56 may include a step function 58 or a $3^{rd}$ order term function 62 as described above. However, the stress function 56 may include any suitable function representing a stress distribution or stress profile that may be applied to a model for predicting distortion and/or residual stress in the workpiece 12. As described above, the stress function 56 may be calibrated to the moment coefficient $C_M$. The moment coefficient $C_M$ represents the resultant of the residual stress induced in the coupon 20 (FIG. 6) by the peening process 10 (FIG. 2). One skilled in the art can appreciate that parameters, such as stress magnitude and depth of the induced residual stress 28 (FIG. 6), may vary with different manufacturing operations and different material compositions of the workpiece 12.

Further in this regard, FIG. 1 illustrates a shot peen process 10 having a blast nozzle 18 configured to project shot 16 at the surface 14 the workpiece 12 to induce residual stresses uniformly along surfaces 14a and 14b of the webs 76 and the ribs 74, respectively. All other machining parameters being equal, the peening process 10 may induce a different residual stress magnitude and through-thickness profile in the webs 76 compared to the residual stress magnitude and through-thickness profile in the ribs 74.

Therefore, the calibrated stress function 56 (FIGS. 32, 35) and the stress magnitude applied to the webs 76 of the finite element workpiece model 38 (FIG. 25) may be different than the calibrated stress function 56 applied to the ribs 74 of the finite element workpiece model 38, resulting in different values for predicted distortion in the webs 76 as compared to predicted distortion in the ribs 74.

The disclosed method may include building an empirical database of different peening process parameters (e.g., peening intensities) of the peening process 10 (FIG. 1) and corresponding moment coefficients $C_M$. For example, the database may include the above-mentioned parameters of peening intensity, exposure time (e.g., to saturation), shot speed, shot path, shot hardness, and shot impact angle. Additional non-limiting examples of machining parameters may include workpiece material composition, and any other of a variety of additional parameters. The database of different peening intensities (e.g., Almen intensities) may include multiple parameter sets, each of which may correspond to a moment coefficient $C_M$ for calibrating a stress function 56 to be applied to the workpiece model 38 (FIG. 25) including, but not limited to, a finite element model.

Referring again to FIG. 20, as shown at block 222 the method may include the step of adjusting the intensity (e.g., Almen intensity) of the peening process 10 (FIG. 1) to alter the predicted distortion in the workpiece 12 (FIG. 24) and/or alter the predicted residual stress in the workpiece 12. For example, a stress function 56 (FIGS. 32, 35) calibrated to a different moment coefficient $C_M$ may be applied to the workpiece model 38 (FIG. 25) in order to achieve a different residual stress distribution and/or different distortion in the workpiece 12. The different moment coefficients $C_M$ may be used to correlate different peening intensities of the peening process 10, correlate plastic deformation of the workpiece 12 (FIG. 24), and compute statically equivalent shape functions 78 (FIGS. 40-42) for distortion simulations. For example, the different stress functions 56 may be calibrated to a moment coefficient $C_M$ representing a lower intensity that reduces the predicted residual stress or distortion in the workpiece model 38. Alternatively, the stress function 56 may be calibrated to a moment coefficient $C_M$ representing a peening intensity that produces a maximum residual stress of increased magnitude and at a greater depth to improve fatigue strength and/or fatigue life of the workpiece and reducing distortion of the workpiece 12.

In regard to improving the modeling solution of the workpiece 12 (FIG. 24), as shown at block 224, the workpiece model 38 (FIG. 25) may be iteratively adjusted based upon the predicted distortion in the workpiece 12 and/or the predicted residual stress in the workpiece 12 resulting from application of the calibrated stress function 56 (FIGS. 32, 35). For example, based upon the results of a finite element analysis of a calibrated stress function 56 applied to the workpiece model 38, the model mesh (e.g., finite elements) may be adjusted to alight to the mesh elements with locations of relatively high magnitude residual stresses. In another non-limiting example, the finite element model boundary conditions (e.g., constraints, loads) may be adjusted based upon the predicted distortion in the workpiece model 38.

Referring to FIG. 39, disclosed is one embodiment of a method, generally designated 300, for predicting distortion in a workpiece 12 (FIG. 1) manufactured using a shot peen process 10 (FIG. 1).

As shown at block 302, the method may include the step of physically measuring displacement of the coupon surface 22 (FIG. 6) in the x, y, and/or xy-directions and calculating the moment coefficient $C_M$ based on the displacement of the coupon surface 22.

As illustrated in FIGS. 2-4, the performance of the shot peening process 10 on the coupon surface 22 may induce residual stress 28 (FIG. 6) in the coupon surface 22 and may cause distortion of the coupon 20. Displacement of the coupon surface 22 may be measure by any suitable technique for measuring part geometry.

Referring to FIGS. 21-23, coupons 20 may be formed of thin rectangular strips of metal (i.e., Almen strips), which may be peened and their deflection (i.e., arc height h) is measured as a function of the peening intensity. This deflection as a function of peening intensity is known as Almen intensity.

Standard Almen strips are made from plain carbon steel SAE 1070 and have hardness about 45 HRC, and typically are used to determining the effectiveness of peening processes 10 (FIG. 2). In general peening processes 10 are calibrated based on the Almen strip intensity up to the point that the peening intensity causes saturation on the strip (e.g., coupon 20). Saturation is reached when further peening does not significantly change the arc height h of the Almen strip (FIG. 21), typically saturation is defined as the point where a double in exposure time results in less than a 10% increase in the final arc height h of the Almen strip.

Referring again to FIG. 39, in a biaxial stress state of the coupon 20 (e.g., Almen strip) after peening, the radius of the curvature (e.g., distortion) may be the same in each of the x and y-direction (e.g., the coupon retains a dome shape after peening). The displacement (e.g., distortion) may be measured as the arc height h of the coupon 20 (FIG. 21). The arc height h may be measured using a measuring device 26 (FIG. 3), such as an Almen gauge.

Alternatively, in a more complex (e.g., non-biaxial) stress state displacement of the coupon surface 22 (FIG. 6) may be physically measured in the x, y, and/or xy-directions and the moment coefficient $C_M$ may be calculated based on the displacement of the coupon surface 22. For example, displacement in the x, y, and/or xy-direction may be measured using optical metrology, such as an advanced topometric sensor (ATOS) to generate section data and/or point cloud data representative of the distorted coupon surface 22, with a coordinate measuring system using a touch probe, or any other suitable measurement technique, without limitation.

Figure 40:
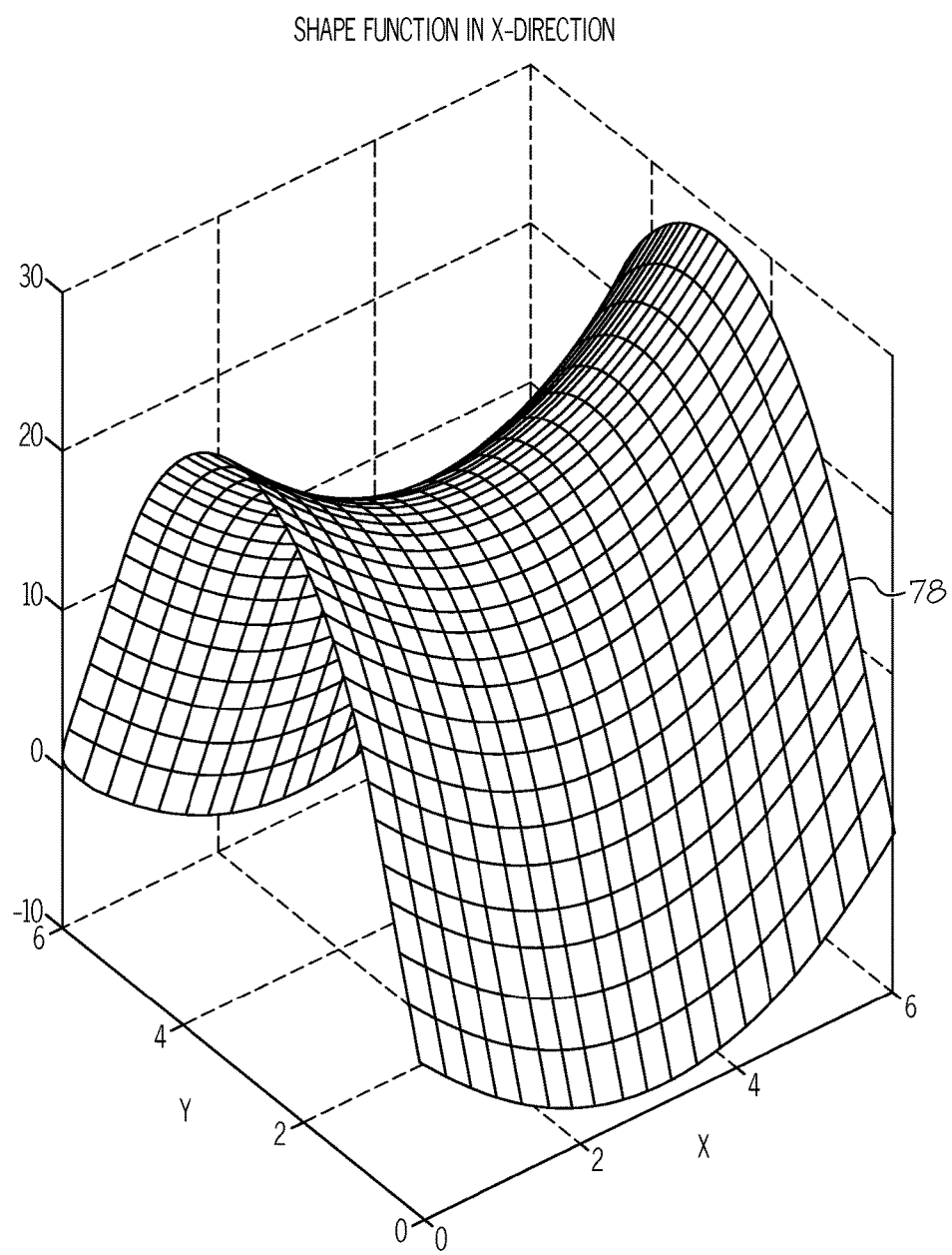
FIG. 40 is an illustration of an example displacement shape function computed from the induced residual stress measurements acting in the x-direction of the coupon.
Figure 41:
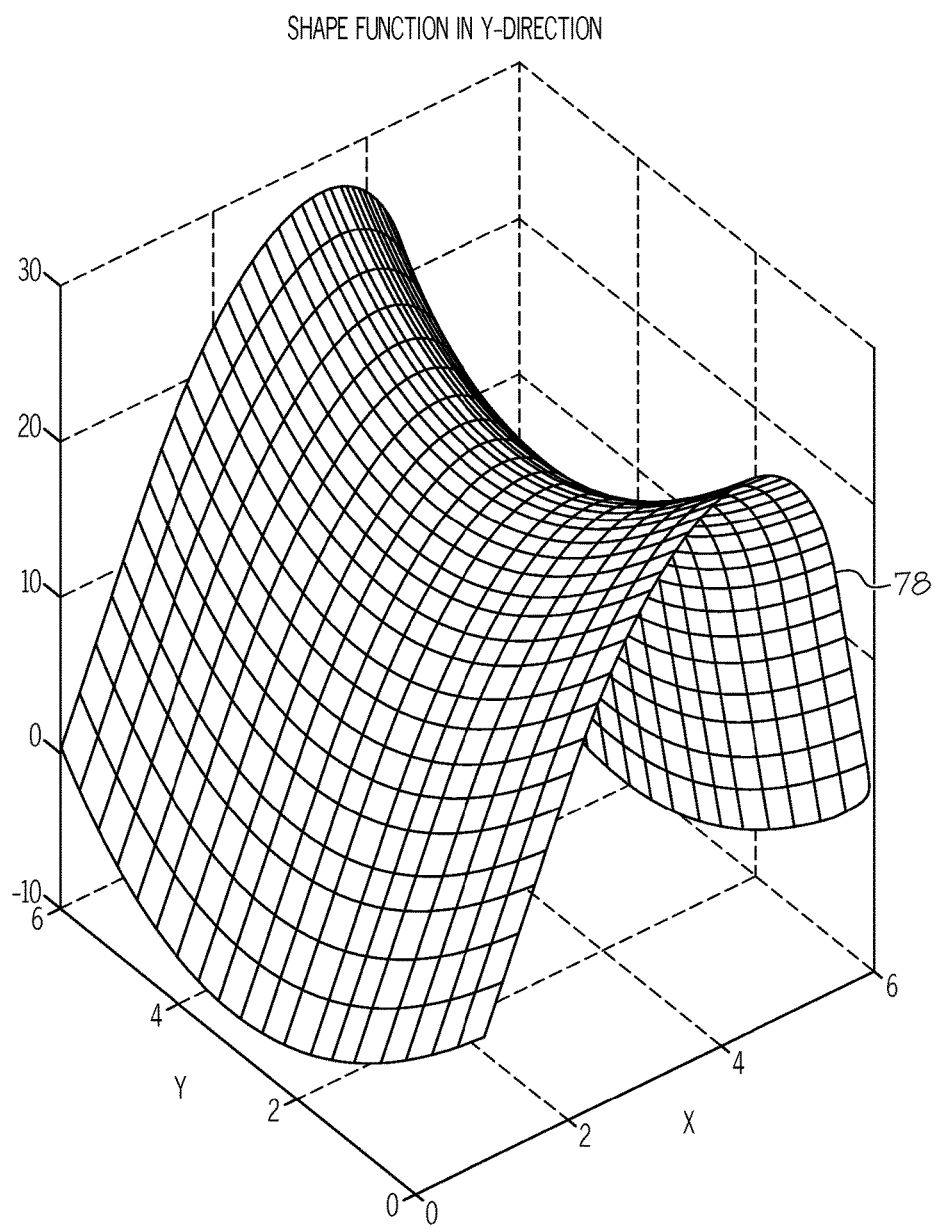
FIG. 41 is an illustration of an example displacement shape function computed from the induced residual stress measurements acting in the y-direction of the coupon.
Figure 42:
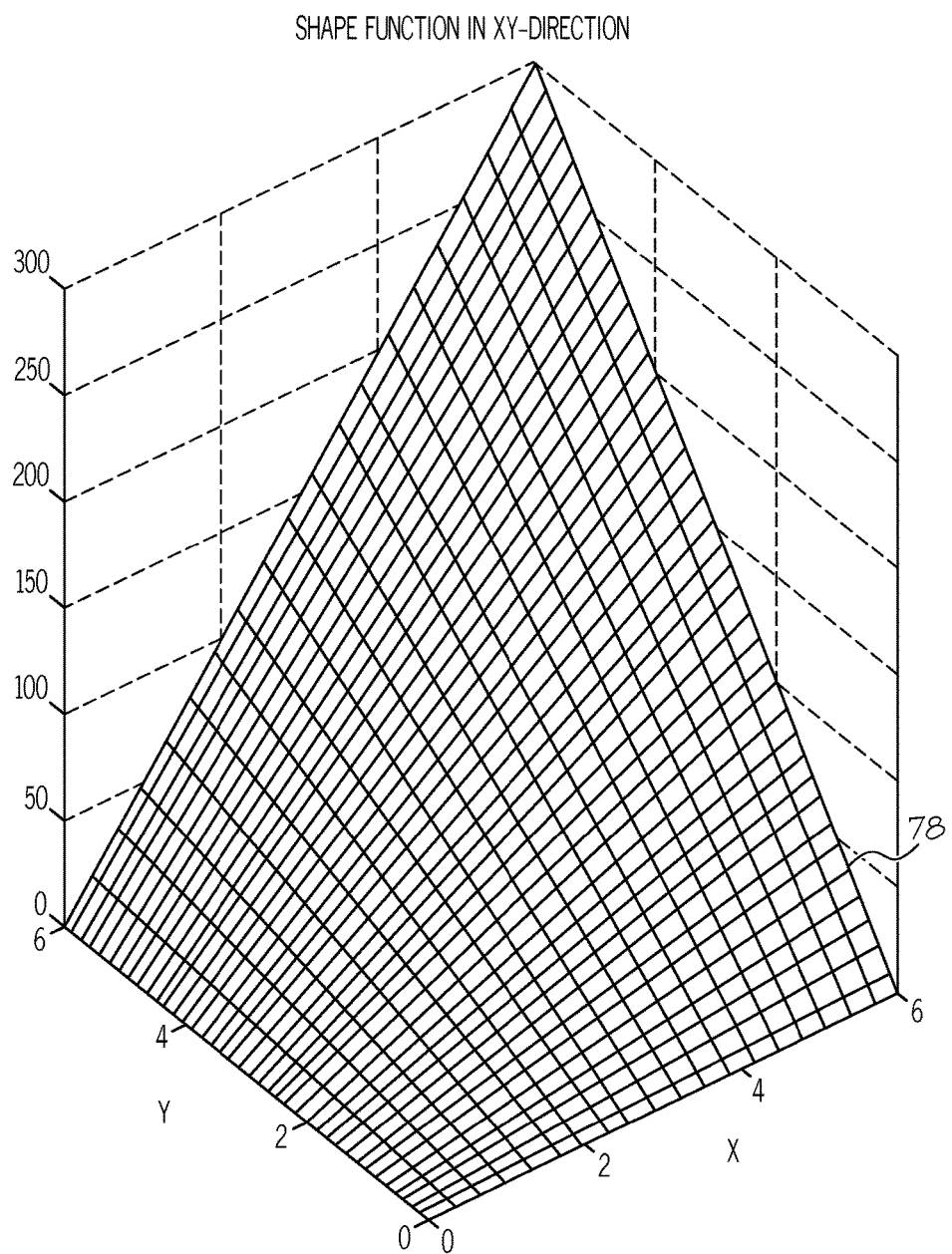
FIG. 42 is an illustration of an example displacement shape function computed from the induced residual stress measurements acting in the xy-direction of the coupon.

As shown at block 304, the method may include the step of fitting the coupon displacement measurements (e.g., arc height h) to a displacement shape function 78 in at least one of the x, y, and/or xy-directions similar to the displacement shape functions 78 illustrated in FIGS. 40-42. The displacement shape functions 78 in the x, y, and/or xy directions may be calculated by solving for the eigenstrain using equations of elasticity (e.g., Young's modulus, Poisson's ratio) to convert stress function.

As shown at block 306, the method may include the step of calculating the moment coefficient $C_M$ in at least one of the x, y, and/or xy-directions. For example, the moment coefficient $C_M$ may be based on the shape function 78. As another example, the moment coefficient $C_M$ may be based on the material composition, dimensions of the coupon 20, and displacement measurements, as will be described below related to equations EQ-120 and EQ-130.

As shown at block 308, the method may include the step of calibrating the stress function 56 and corresponding stress magnitude $S_{max}$ to the moment coefficient $C_M$ in a manner as described above in the method step shown at block 210 of FIG. 20.

As shown at block 310, the method may include the step of applying the calibrated stress function 56 (FIGS. 32. 35) to a workpiece model 38 (FIG. 25), such as a finite element model as described above in the method step shown at block 218 of FIG. 20.

As shown at block 312, the method may include the step of computing predicted distortion of the workpiece 12 (FIG. 24) resulting from application of the calibrated stress function 56 to the workpiece model 38 as is described above with regard to the method step shown at block 220 illustrated in FIG. 20.

The moment coefficient $C_M$ may optionally be calculated by applying the fitted induced residual stress measurements 30 (FIG. 8B) to a model 80 of the plate coupon 20 (FIG. 7), such as a finite element model, and extracting coupon surface 22 (FIG. 6) displacement measurements in the x, y, and/or xy-directions resulting from the application of the fitted induced residual stress measurements 31 to the coupon model 80. The coupon displacement measurements may then be fitted to a displacement shape function 78 such as that which is illustrated in FIGS. 40-42 and described above with regard to the method step illustrated at block 304 of FIG. 39.

The moment coefficient $C_M$ may be calculated for the x, y, and/or xy-direction using the following equation EQ-110:

$$C_M = (A_2 t_h^3)/12 \qquad (\text{EQ-110})$$

wherein $A_2$ represents the fitted coefficient (e.g., multiplier) of the displacement shape function 78 in the x, y, and/or xy-directions and $t_h$ represents the coupon thickness (FIG. 23). As indicated above, the moment coefficient $C_M$ represents the induced residual stress moment about a neutral axis of the plate coupon based upon the displacement shape function 78 (FIGS. 40-42).

The wide use of standard Almen strip coupons due to standardization may limit the potential of peening technologies (e.g., increased fatigue life, feedback for forming guidance, and influence on tolerances) due to the lack of information regarding the peening effects on the specific material being peened. Plastic deformation and saturation are directly related to the yield strength of the materials. Hence, deformation and saturation levels for other materials such as aluminum and titanium are expected to differ significantly since their elasto-plastic behaviors are different. Therefore translating peening intensities based on standard Almen strips can result on overestimation or underestimation of the residual stresses affecting the peening part, missing detrimental effects from exceeded intensities or potential benefits from higher intensities. Using the same material as that of the component to be peened (e.g., workpiece 12) to create the testing coupon 20 and relating the deflection of the coupon 20 for different peening intensities (e.g., up to saturation levels) to residual stress 28 may provide the capability to better select peening intensities and to better control distortion and surface residual stresses levels on peened components.

Therefore, the moment coefficient $C_M$ may be calculated for the x, y, and/or xy-direction to account for material composition and coupon dimensions (e.g., length L, width W (FIGS. 21-23)). The moment coefficient $C_M$ may be calculated using the following equation EQ-120 (e.g., based from Timoshenko plate equations):

$$C_M = (2D(1-v)/[(L/2)^2 + (W/2)^2])h_{max} \qquad (\text{EQ-120})$$

wherein D represents the flexural rigidity of the coupon 20, v represents the Poisson's ratio, L represents the length dimension of the coupon 20, W represents the width dimension of the coupon 20, and $h_{max}$ represents the maximum displacement (e.g., arc height) measured on the coupon 20 (e.g., Almen strip).

Alternatively, the moment coefficient $C_M$ may also be calculated for the x, y, and/or xy-direction to account for material composition and coupon dimensions (e.g., length L, width W, and thickness $t_h$) using the following equation EQ-130:

$$C_M = 2Et_h^2 h_{max}/3(1-\nu)(L^2+W^2) \quad \text{(EQ-130)}$$

wherein E represents the modulus of elasticity of the material composition of the coupon 20, $t_h$ represents the thickness dimension of the coupon 20, $h_{max}$ represents the maximum displacement (e.g., arc height) measured on the coupon 20, $\nu$ represents the Poisson's ratio, L represents the length dimension of the coupon 20, and W represents the width dimension of the coupon 20.

The computation of the force coefficient $C_F$ and the moment coefficient $C_M$ may be performed indirectly from the displacement field of a coupon 20 having a uniform thickness t (e.g., Almen strip). The measured displacement of the coupon 20 may be fitted as a linear combination of the deformation shape caused by uniform components of stress, as illustrated below in equations EQ-140 and EQ-150:

$$\sigma_{uniform} = A_1 \quad \text{(EQ-140)}$$

$$\sigma_{linear} = A_2[z-(t/2)] \quad \text{(EQ-150)}$$

wherein $A_1$ and $A_2$ are constant coefficients to be calibrated and equations EQ-140 and EQ-150 are defined over the entire thickness of the coupon 20.

The uniform term $A_1$ represents the stretch of the coupon 20 and is directly calibrated with the in-plane components of the displacement (e.g., two orthogonal uniform stretches and one skewness for each planar stress component). The coefficient $A_2$ may be obtained by computing a least squares fit between the out-of-plane (e.g., normal) component of the measured displacement and the linear combination of shape functions 78 (FIGS. 40-42) obtained by setting the coefficient $A_2$ to one (1) in equation EQ-150 for each planar component of the stress tensor (e.g., $\sigma_x$, $\sigma_y$, $\sigma_{xy}$). The moment coefficient $C_M$, used to fit any other shape function 78, may be calculated in any one of the x, y, and/or xy-directions using equation EQ-110 illustrated above.

The coupon 20 (FIG. 6) may be configured to have a substantially similar material composition as a corresponding workpiece 12 (FIG. 24). For example, the coupon 20 may be formed of a titanium allow substantially similar to the titanium allow composing the workpiece 12 or the coupon 20 may be formed of an aluminum alloy substantially similar to an aluminum alloy composing the workpiece 12. As expressed above, equations EQ-120 and EQ-130 may be used to calculate the moment coefficient $C_M$ of the coupon 20 using a standard Almen intensity method (FIGS. 2-5) since only the material composition of the coupon 20 is modified relative to a standard Almen strip. Thus, $h_{max}$ may be measured using a standard measuring device 26 (FIG. 4) (e.g., Almen gauge) to correlate a peening intensity and calculate a moment coefficient $C_M$ of a particular material composition of a corresponding workpiece 12 and predict induced residual stress and/or deformation of the workpiece 12 undergoing the peening process 10 (FIG. 1) set at the correlated peening intensity.

Advantageously, the above-described method 300 illustrated in FIG. 39 of physically measuring displacement of the coupon surface 22 (FIG. 6) to determine the moment coefficient $C_M$ may avoid inaccuracies and costs associated with the measurement of residual stress 28 (FIG. 6) in the coupon surface 22 for determining the moment coefficient $C_M$. For example, measurement of residual stress 28 using x-ray diffraction or neutron diffraction may be cost and schedule prohibitive considering the cost of materials and time and expense required for machining of plate coupons and analysis of measured results. Coupon boring may provide a low-cost alternative for measuring stress in general, however, coupon boring may present challenges in measuring residual stress in a coupon surface 22 with the relatively high degree of accuracy necessary for determining the moment coefficient $C_M$. Likewise, laser interferometry, speckle interferometry, ultrasonic imaging, and magnetic resonance imaging may also present challenges in measuring residual stress. Dissecting or slitting, although favorable from a cost standpoint, may also present challenges in providing the degree of accuracy necessary for measuring residual stress 28 in a plate coupon.

Figure 43:
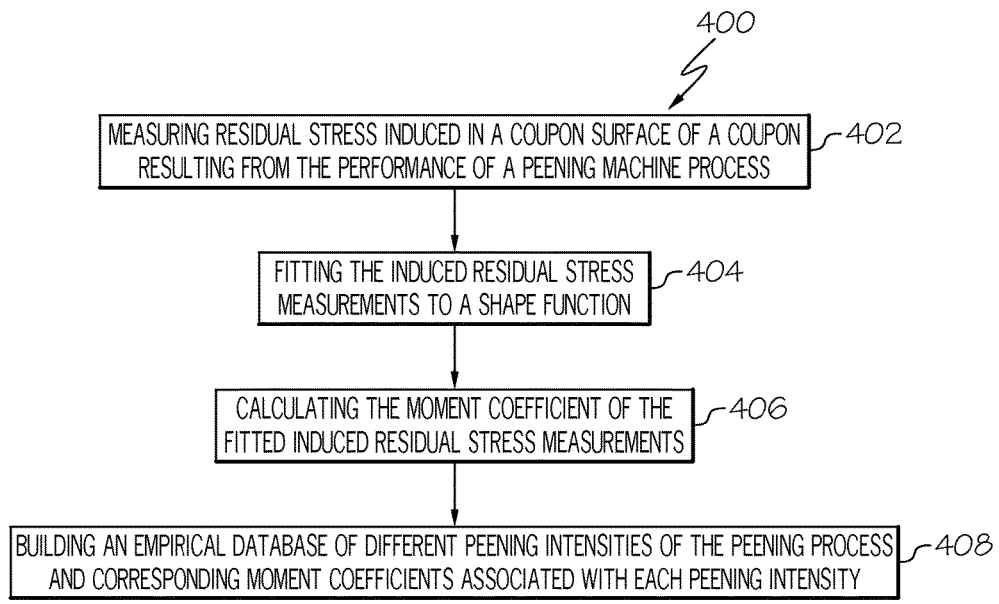
FIG. 43 is a flow diagram of an embodiment of the disclosed method for building a database of different peening intensities and corresponding moment coefficients.

Referring to FIG. 43, also disclosed is a method, generally designated 400, for building a database of moment coefficients $C_M$, each of which may correspond to a selected penning intensity of the peening process 10, as mentioned above.

As shown at block 402, the method may include the step of measuring the induced residual stress 28 in a coupon surface 22 (FIG. 6) of the coupon 20 (FIG. 6) similar to that described above in the method step shown at block 204 of FIG. 20. The coupon 20 residual stress 28 may be induced in the coupon surface 22 by the selected peening intensity of the peening process 10.

As shown at block 404, the method may include the step of fitting the coupon induced residual stress measurements to a curve shaped function 32 in the x, y, and/or xy-directions similar to that which is illustrated by example in FIGS. 8A and 8B.

As shown at block 406, the method may include the step of calculating the moment coefficient $C_M$ representative of the residual stress 28 (FIG. 6) induced in the coupon 20 (FIG. 6) by the selected peening intensity using the equation EQ-70 described above.

As shown at block 408, the method may include the step of building an empirical database of different peening intensities and corresponding moment coefficients $C_M$ associated with each peening intensity. In this regard, the database may include one or more of any number of different parameters associated with the peening process 10 associated with the coupon 20 and which may affect the residual stress induced in the coupon surface 22 by the selected peening intensity.

Figure 44:
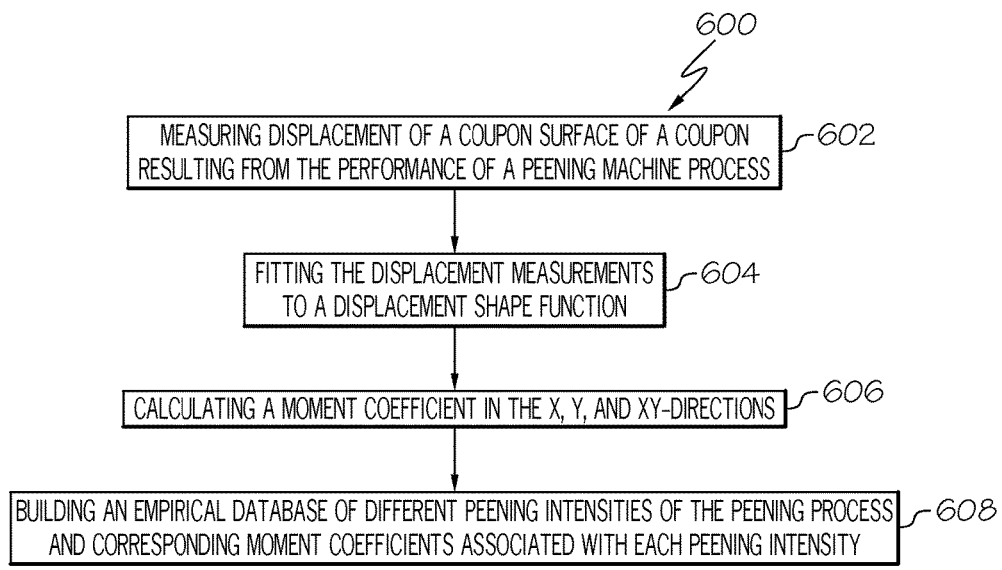
FIG. 44 is a flow diagram of another embodiment of the disclosed method for building a database of different peening intensities and corresponding moment coefficients.

Referring to FIG. 44, also disclosed in a method, generally designated 600, for building a database of moment coefficients $C_M$, each of which may correspond to a selected penning intensity of the peening process 10, as mentioned above.

As shown at block 602, the method 600 may include the step of measuring the displacement in a coupon surface 22 (FIG. 6) of the coupon 20 (FIG. 6) resulting from the performance of a peening process 10, similar to that described above in the method step shown at block 302 of FIG. 39. Displacement of the coupon 20 may be created in the coupon surface 22 by the selected peening intensity of the peening process 10.

As shown at block 604, the method 600 may include the step of fitting the coupon displacement measurements to a displacement shape function 78 in the x, y, and/or xy-directions similar to that which is illustrated by example in FIGS. 40-42.

As shown at block 606, the method 600 may include the step of calculating the moment coefficient $C_M$ in the x, y, and/or xy-direction based on the shape function 78.

As shown at block 608, the method 600 may include the step of building an empirical database of different peening intensities and corresponding moment coefficients $C_M$ associated with each peening intensity. In this regard, the database may include one or more of any number of different parameters associated with the peening process 10 associated with the coupon 20 and which may affect the residual stress induced in the coupon surface 22 by the selected peening intensity.

Advantageously the embodiments disclosed herein may provide a means to predict distortion and/or residual stress that may occur in a workpiece 12 and adjusting manufacturing operations (e.g., intensity of a peening process 10) to minimize or maximize the residual stress magnitude in the workpiece 12 and control distortion of the workpiece 12. For example, one or more of the embodiments disclosed herein may be advantageously implemented in the aerospace industry wherein the machining parameters of the peening process 10 (e.g., peening intensity) may be adjusted to control the induced residual stresses and reduce or eliminate distortion in a metallic workpiece as a result of the peening operation preformed on the workpiece 12.

Illustrating this point by way of example, the above-described process may be applied to an aluminum or titanium workpiece designed as an elongated planar member having width and length dimensions, where the length may be substantially greater than the width (e.g., twelve (12) inches by eighty-six (86) inches, respectively). The planar member may include a plurality of webs extending along the length dimension of the workpiece. The webs may be machined to relatively small thicknesses (e.g., ranging from approximately 0.090 to 0.227 inch). Each web may be separated from adjacent webs along the length dimension of the workpiece by a rib extending outwardly from the webs and oriented transversely related to the workpiece length.

The workpiece may be machined using an original set of peening process parameters (e.g., peening intensity) that result in bending distortion in the workpiece due to residual stress from the peening process. The distortion in the workpiece may be characterized by a generally constant curvature along the length direction of the workpiece with a measured displacement (e.g., approximately four (4) inches) as one end of the workpiece relative to an opposite end of the workpiece (e.g., bending). Due to such a degree of curvature, re-working of the workpiece by straightening may be required to remove the curvature to bring the workpiece within acceptable tolerances.

Test coupons having a material composition substantially similar to the workpiece (e.g., aluminum or titanium) may be measured to determine the moment coefficient $C_M$ for calibrating a stress function that may be applied to a finite element model of the workpiece. The coupons may be representative of the material composition of the workpiece (e.g., aluminum, titanium, aluminum alloy, titanium allow) and the original peening parameters. The finite element solution resulting from application of the calibrated stress function may predict a distortion (e.g., approximately 3.3 inches) induced in the workpiece (e.g., bending) by the peening process and which may correlate with the measured workpiece distortion (e.g., approximately four (4) inches).

The peening parameters (e.g., peening intensity) and finite element model of the workpiece may then be adjusted and optimized until the predicted distortion falls within acceptable limits. The optimization process may result in a predicted distortion (e.g., approximately 0.009 inch) of bending displacement of the workpiece (e.g., curvature along the length direction of the workpiece). The workpiece may then be machined using the optimized peening parameters (e.g., peening intensity) resulting in distortion that may not be measurable due to the small magnitude of distortion. The same process described above for reducing distortion may be used to optimize peening parameters (e.g., peening intensity) to induce the formation of residual stresses that are favorable (e.g., predominately compressive) in the workpiece, such as to enhance fatigue life and/or minimize crack growth. Furthermore, the above-described example is not to be construed as being limited to machining of metallic structures for the aerospace industry, but may be applied to any manufacturing operation without limitation and may be implemented in any industry where residual stress is induced in any type of workpiece as a result of the application of energy, such as shot peening, laser peening, or other application of force or heat to the workpiece.

Figure 45:
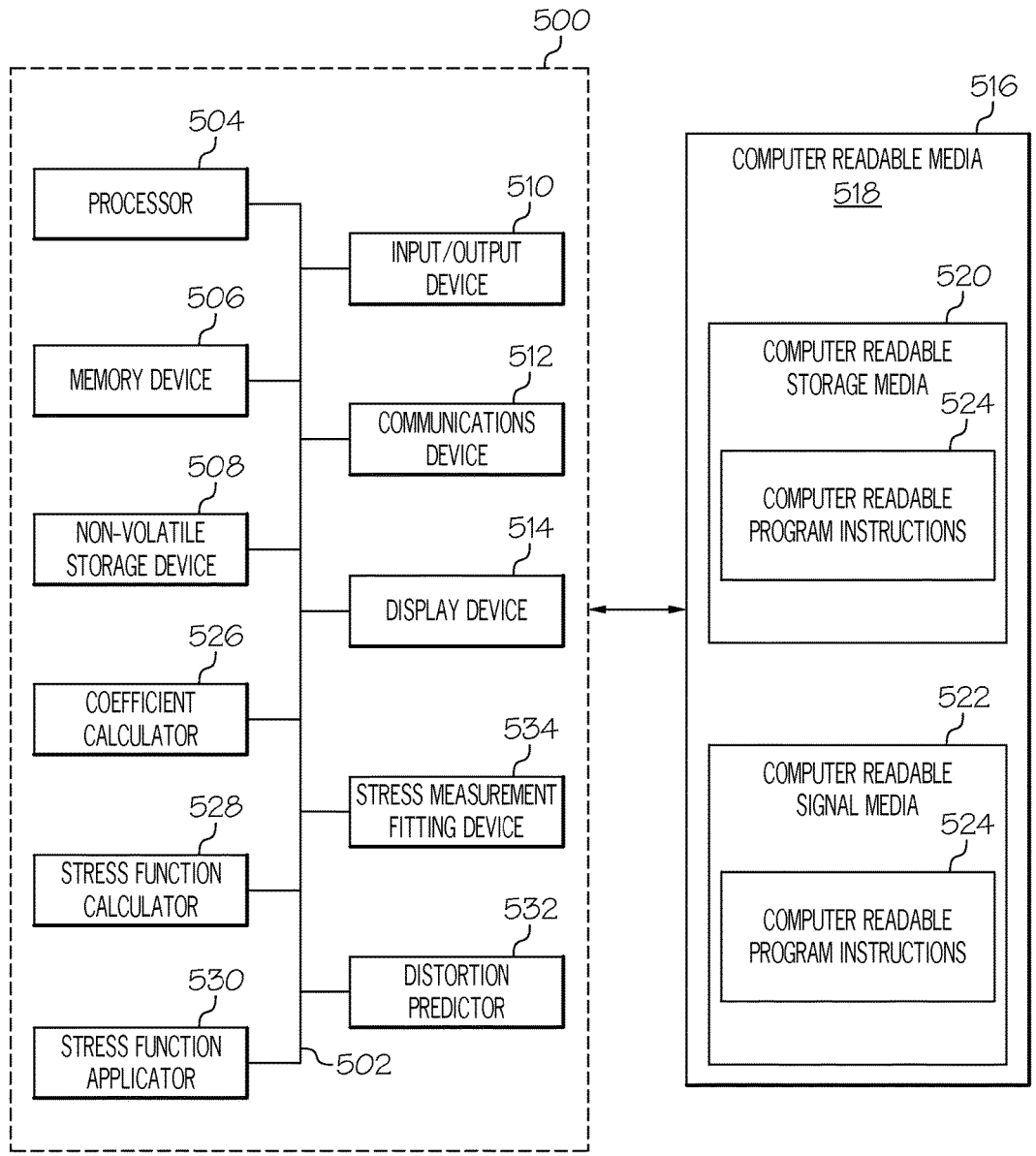
FIG. 45 is block diagram of an embodiment of a processor-based system for implementing one or more operations of the disclosed method for predicting residual stress and/or distortion in a workpiece.

Referring to FIG. 45, the above-described steps of the disclosed methods or any combination of the steps, in whole or in part, may be implemented in a computer-implemented process, such as on a processor-based system 500 or other suitable computer system. The processor-based system 500 may perform computable readable program instructions 524. The computer readable program instructions 524 may be provided to or loaded onto the processor-based system 500 in order to implement one or more of the above described operations or steps. In a non-limiting example, the processor-based system 500 and/or the computer readable program instructions 524 may facilitate the prediction of residual stress 28 (FIG. 6) and or distortion (FIG. 32, 35) induced in a workpiece 12 (FIG. 24) manufactured using a peening process 10 (FIG. 1).

The block diagram of FIG. 45 may illustrate an embodiment of the processor-based system 500 that may use measurements of residual stress 28 induced in a coupon 20 manufactured by the peening process 10 to predict residual stress 28 in a workpiece 12. In the illustrated embodiment, the processor-based system 500 may include a data communication path 502 (e.g., data link) to communicatively couple one or more components to facilitate transfer of data between such components. The communication path 502 may include one or more data buses and any other suitable communication path that facilitates the transfer of data between the components and devices of the processor-based system 500.

In a non-limiting embodiment, the components may include one or more of a processor 504, a memory device 506, a non-volatile storage device 508, a communications device 512, and input/output device 510, a display device 514, a coefficient calculator 526, a stress function calibrator 528, a stress function applicator 530, a distortion predictor 532, and a stress measurement fitting device 534. The coefficient calculator 526 may calculate the moment coefficient $C_M$ representative of residual stress 28 induced in a coupon 20 (FIG. 6) by the peening process 10 (FIG. 2).

The coefficient calculator 526 may calculate the moment coefficient $C_M$ in a manner described above with regard to the method step shown at block 208 of FIG. 20 or in a manner described above with regard to the method step shown at block 306 of FIG. 39 or the method step shown at block 406 of FIG. 43.

For example, the coefficient calculator 526 may calculate the moment coefficient $C_M$ using the fitted induced residual stress measurements 30 (FIG. 8B) in the coupon 20 for each one of the x, y, and/or xy-directions. The fitted induced stress measurements 30 may be determined as described above in the method step shown at block 204 of FIG. 20, wherein the residual stress 28 (FIG. 6) induced in the coupon 20 may be measured along at least one of the x-direction, the y-direction, and/or the xy-direction, such as by using x-ray diffraction or any other suitable stress measurement technique.

As another example, the coefficient calculator 526 may calculate the moment coefficient $C_M$ using the displacement measurements in the coupon 20 for each one of the x, y, and/or xy-direction. The displacement measurements may be determined as described above in the method step shown at block 302 of FIG. 39, wherein the displacement of the coupon 20 may be measured along at least one of the x, y, and/or xy-directions, such as by a measuring device 26.

The stress measurement fitting device 534 may receive the induced residual stress measurements 30 (FIG. 8B) which may be input into the stress measurement fitting device 534 using the input/output device 510 so that the stress measurement fitting device 534 may fit the induced residual stress measurements 30 to a curve shaped function 32, such as the least squares polynomial approximation illustrated in FIG. 8A by using EQ-50 as described in the method step shown at block 206 of FIG. 20 or in the method step shown at block 304 in FIG. 39. The fitted polynomial approximation illustrated in FIG. 8B may represent the actual induced residual strain distribution in the coupon 20. The induced residual stress measurements 30 may be provided to the coefficient calculator 526 via the communications path 502, such that the coefficient calculator 526 may then calculate the moment coefficient $C_M$ for the x, y, and/or xy-directions.

The stress function calibrator 528 may calculate the moment coefficient $C_M$ from the fitted (e.g., polynomial approximation) induced residual stress measurements 30 for each one of the x, y, and/or xy-directions using EQ-70 as described above in the method step shown at block 210 of FIG. 20 or in the method step shown at block 308 of FIG. 39. For example, the depth term d in EQ-80 (e.g., step function) and the depth term d in EQ-100 (e.g., $3^{rd}$ order term function) may be set to be less than the depth at which the induced residual stress measurements diminish to zero in the coupon 20 as described with regard to the method step shown at block 212 of FIG. 20. The stress function calibrator 528 may then equate the moment of the step function 58 (FIG. 9) or the $3^{rd}$ order term function 62 (FIG. 11) to the moment coefficient $C_M$ as described in the method step shown at block 214 of FIG. 20 and solve for the stress magnitude term $S_{max}$ (EQ-80) of the step function 58 or the stress magnitude term $S_{max}$ (EQ-100) of the $3^{rd}$ order term function for each one of the x, y, and/or xy-directions as described above in the method step shown at block 216 of FIG. 20.

The stress function applicator 530 may receive the calibrated stress function 56 from the stress function calibrator 528 via the communications path 502. The stress function applicator 530 may apply the calibrated stress function 56 to a workpiece model 38 (FIG. 25), such as a finite element model, in a manner as described above in the method step shown at block 218 of FIG. 20 or in the method step shown at block 310 of FIG. 39. For example, the stress function applicator 530 may apply the calibrated stress function 56 (FIGS. 32, 35) to the workpiece model 38 at the calibrated stress magnitude $S_{max}$ (EQ-80) and $S_{max}$ (EQ-100) for the corresponding calibrated step function 56 and $3^{rd}$ order term function 62, respectively, along the corresponding fixed depth d of the calibrated stress magnitude $S_{max}$. However, as indicated above, the stress function applicator 530 may apply any calibrated stress function to the workpiece model 38 and in not limited to applying a calibrated step function 56 (FIG. 32) or a calibrated $3^{rd}$ order term function 62 (FIG. 35).

The distortion predictor 532 may compute predicted distortion and/or predicted residual stress in the workpiece 12 (FIG. 24) resulting from application of the calibrated stress function 56 (FIG. 32, 35) to the workpiece model 38 (FIG. 25) at the calibrated stress magnitude $S_{max}$ (EQ-80) and $S_{max}$ (EQ-100) and corresponding depth d as described in the method step shown at block 220 of FIG. 20 or the method step shown at block 313 of FIG. 39. The distortion predictor 532 may receive the results from the application of the calibrated stress function 56 to the workpiece model 38 by the stress function applicator 530 such as via the communications path 502. The results of the predicted distortion and/or predicted residual stress in the workpiece 12 may be transmitted to the input/output device 510 such as by the display device 514 which may display a computer simulation of the workpiece model 38 predicted distortion and/or predicted residual stress in the workpiece 12. The predicted distortion and/or predicted residual stress may be displayed on the display device 514 as a graphical display and/or as numerical values representative of the magnitude and/or direction of the distortion and/or residual stress relative to a reference point (not shown) of the workpiece model 38 (FIG. 25). However, the output of the stress function applicator 530 may be by any suitable means and is not limited to graphical or numerical display on the display device 514.

In an embodiment, the processor-based system 500 may include one or more processors 504 configured for executing instruction of computer readable program instructions 524 that may be installed into the memory device 506. Alternatively, the processor 504 may include a multi-processor core having two or more integrated processor cores. Even further, the processor 504 may include a main processor and one or more secondary processors integrated on a chip. The processor 504 may also include a many-processor system having a plurality of configured processors.

The processor-based system 500 may further include one or more memory devices 506 which may include one or more volatile or non-volatile storage device 508. However, the memory device 506 may include any hardware device for storing data. For example, the memory device 506 may include a random access memory or a cache of an interface and/or integrated memory controller hub, which may be included in the communications path 502. The memory device 506 may be configured to permanently and/or temporarily store any one of a variety of different types of data, computer readable code, or program instruction 524, or any other type of information. The non-volatile storage device 508 may be provided in a variety of configurations including, but not limited to, a flash memory device, a hard drive, an optical disk, a hard disk, a magnetic tape, or any other suitable embodiment for long-term storage. In addition, the non-volatile storage device 508 may include a removable device, such as a removable hard drive.

The processor-based system 500 may also include one or more of the input/output devices 510 to facilitate the transfer of data between components that may be connected to the processor-based system 500. The input/output device 510 may be directly and/or indirectly coupled to the processor-based system 500. The input/output device 510 may facilitate user-input by means of a peripheral device, such as a keyboard, a mouse, a joystick, a touch screen, and any other suitable device for inputting data to the processor-based system 500. The input/output device 510 may include an output device for transferring data representative of the output of the processor-based system 500. For example, the input/output device 510 may include a display device 514, such as a computer monitor or computer screen for displaying results of data processed by the processor-based system 500. The input/output device 510 may optionally include a printer or fax machine for printing a hardcopy of information processed by the processor-based system 500.

The processor-based system 500 may include one or more communications devices 512 to facilitate communication of the processor-based system 500 within a computer network and/or with other processor-based systems. Communication of the processor-based system 500 with a computer network or with other processor-based systems may be by wireless means and/or by hardwire connection. For example, the communications device 512 may include a network interface controller to enable wireless or cable communication between the processor-based system 500 and a computer network. The communications device 512 may also include a modem and/or network adapter or any one of a variety of alternative devices for transmitting and receiving data.

One or more of the operations of the disclosed methods 200, 300 described above for predicting and/or validating residual stress 28 (FIG. 6) in a workpiece 12 (FIG. 24) may be performed by the processor 504 and/or by one or more of the coefficient calculator 526, the stress function calibrator 528, the stress function applicator 530, the distortion predictor 532, and the stress measurement fitting device 534 using the computer readable program instructions 524. The computer readable program instructions 524 may include program code, which may include computer usable program code and computer readable program code. The computer readable program instructions 524 may be read and executed by the processor 504. The computer readable program instructions 524 may enable the processor 504 to perform one or more operations of the above-described embodiments associated with predicting residual stress 28 and distortion in a workpiece 12.

The computer readable program instructions 524 may include operating instructions for the processor-based system 500 and may include applications and programs. The computer readable program instruction 524 may be contained and/or loaded onto one or more of the memory devices 506 and/or non-volatile storage devices 508 for execution by the processor 504 and/or the coefficient calculator 526, the stress function calibrator 528, the stress function applicator 530, the distortion predictor 532, and the stress measurement fitting device 534. As indicated above, one or more of the memory devices 506 and/or non-volatile storage devices 508 may be communicatively coupled to one or more of the remaining components illustrated in FIG. 44 through the communications path 502.

The computer readable program instructions 524 may be contained on tangible or non-tangible, transitory or non-transitory computer readable medial 518 and which may be loaded onto or transferred to the processor-based system 500 for execution by the processor 504. The computer readable program instructions 524 and the computer readable media 518 may include a computer program product 516. In an embodiment, the computer readable media 518 may include computer readable storage media 520 and/or computer readable signal media.

The computer readable storage media 520 may include a variety of different embodiments including, but not limited to, optical disks and magnetic disks that may be loaded into a drive, a flash memory device or other storage device or hardware for the transfer of data onto a storage device, such as a hard drive. The computer readable storage media 520 may be non-removably installed on the processor-based system 500. The computer readable storage media 520 may include any suitable storage media and may include, without limitation, a semiconductor system or a propagation medium. In this regard, the computer readable storage media 520 may include electronic media, magnetic media, optical media, electromagnetic media and infrared media. For example, the computer readable storage media 520 may include magnetic tape, a computer diskette, random access memory, and read-only memory. Non-limiting examples of embodiment of optical disks may include compact disks—read only memory, compact disks—read/write, and digital video disks.

The computer readable signal media 522 may contain the computer readable program instructions 524 and may be embodied in a variety of data signal configurations including, but not limited to, an electromagnetic signal and an optical signal. Such data signals may be transmitted by any suitable communications link including by wireless or by hardwire communications. For example, the hardwire communications may include an optical fiber cable, a coaxial cable, a signal wire, and any other suitable means for transmitting data by wired or physical means.

The computer readable signal media 522 may facilitate the downloading of the computer readable program instructions 524 to the non-volatile storage or other suitable storage or memory device for use within the processor-based system 500. For example, the computer readable program instructions 524 contained within the computer readable storage media 520 may be downloaded to the processor-based system 500 over a computer network from a server or client computer of another system.

Any one of a variety of different embodiments of the processor-based system 500 may be implemented using any hardware device or system capable of executing the computer readable program instructions 524. For example, the processor 504 may include a hardware unit configured for performing one or more particular function wherein the computer readable program instructions 524 for performing the functions may be pre-loaded into the memory device 506.

In an embodiment, the processor 504 may include an application specific integrated circuit (ASIC), a programmable logic device, or any other hardware device configured to perform one or more specific functions or operations. For example, a programmable logic device may be temporarily or permanently programmed to perform one or more of the operations related to the disclosed methods of predicting residual stress 28 (FIG. 6) or distortion in a workpiece 12 (FIG. 24) due to a peening process 10 (FIG. 1) having set machining parameters (e.g., peening intensity). The programmable logic device may include a programmable logic array, programmable array logic, a field programmable logic array, a filed programmable gate array, and any other suitable logic device, without limitation. In an embodiment, the computer readable program instructions 524 may be operated by one or more processor 504 and/or by other devices including one or more hardware units in communication with the processor 504. Certain portions of the computer readable program instructions 524 may be run by the processor 504 and other portions of the computer readable program instructions 524 may be run by the hardware units.

Advantageously, the various embodiments described herein may provide the ability to predict residual stress 28 (FIG. 6) and distortion (FIGS. 32, 35) that may occur in a workpiece 12 (FIG. 24) with the further technical effect of obviating the need to manufacture a physical workpiece 12 in order to determine the residual stress 28 that may occur in the workpiece 12 as a result of performing a peening process 10 (FIG. 1) having set parameters (e.g., peening intensity) on the workpiece 12. In this regard, the technical effect of performing one or more operation of the above-described method may include the elimination of the need to iteratively adjust the parameters peening process (e.g., peening intensity), fabricate a new workpiece 12, measure the residual stress 28 in the new workpiece 12, and then re-adjust the peening parameters until the residual stress 28 and/or the distortion falls within acceptable limits. Furthermore, the various advantageous embodiments described herein may provide the effect of increasing the efficiency and accuracy in validating predictions of residual stress 28 that may occur in a workpiece 12 as a result of the performance of the peening process 10 on the workpiece 12 at certain set peening intensities.

Further, the various embodiments of the disclosed method may provide the ability to determine an appropriate peening intensity of the peening process 10 (FIG. 1) by incorporating material properties of the workpiece 12 (FIG. 24) into the calibration process. The disclosed system and method may allow for the characterization of peening intensities based on the material composition and geometry of the workpiece 12 and may allow for the quantification of the residual stresses 28 induced by the peening process 10. Through identification and incorporation of the peening intensities for different materials and geometries, the peening process 10 used to increase the strength and fatigue life of a particular part (e.g., the workpiece 12) may be improved. Generally, the higher the peening intensity used on a workpiece 12, the higher the material strength and longer the fatigue life of that part. However, peening intensity must be balanced with distortion of the workpiece 12.

Accordingly, the disclosed method may provide for calibration of shot peening systems by relating different peening intensities (e.g., up to a saturation level) to residual stress induced in a workpiece. The system and method may provide an improved capability to select a peening intensity and control distortion and surface residual stress levels on a peened component.

Although various embodiments of the disclosed system and method for predicting distortion resulting from a peening process have been shown and described, modifications may occur to those skilled in the art upon reading the specification. The present application includes such modifications and is limited only by the scope of the claims.

What is claimed is:

1. A method of predicting distortion in a workpiece, comprising a material, resulting from a shot peening process to induce compressive stresses in said workpiece, said method comprising the steps of:
    setting physical parameters of said shot peening process, said parameters comprising peening intensity, peening time, shot speed, shot hardness, and impact angle;
    shot peening a plate coupon, comprising said material, using a shot peening machine using said parameters;
    inducing residual stress in a coupon surface of said plate coupon in response to said shot peening;
    measuring induced residual stress in said coupon surface of said plate coupon along at least one of an x-direction, a y-direction, and an xy-direction using a stress measurement tool;
    fitting induced residual stress measurements to a curve shape function;
    calculating a moment coefficient representative of said induced residual stress in said coupon surface;
    calibrating a stress function to said moment coefficient, wherein a calibrated stress function comprises a depth term and a stress magnitude term;
    fixing said depth term of said calibrated stress function to be less than a depth at which said induced residual stress measurements diminish to zero in said plate coupon;
    equating a moment of said calibrated stress function to said moment coefficient;
    solving for said stress magnitude term of said calibrated stress function;
    applying said calibrated stress function to a workpiece model of said workpiece; and
    based on application of said calibrated stress function to said workpiece model, predicting distortion of said workpiece in response to said shot peening using said parameters to achieve a desired induced residual stress in said workpiece.

2. The method of claim 1 further comprising the steps of:
    building an empirical database of different peening intensities of said shot peening process; and
    correlating different predicted distortions with each of said peening intensities of said database of different peening intensities.

3. The method of claim 1 wherein said step of calculating said moment coefficient comprises the steps of:
    physically measuring displacement of said coupon surface; and
    calculating said moment coefficient based upon displacement measurements.

4. The method of claim 3 wherein said step of calculating said moment coefficient based upon said displacement measurements comprises calculating said moment coefficient based on a flexural rigidity of said plate coupon, Poisson's ratio, a length dimension of said plate coupon, a width dimension of said plate coupon, and a maximum displacement measured on said coupon surface.

5. The method of claim 3 wherein said step of calculating said moment coefficient based upon said displacement measurements comprises calculating said moment coefficient based on a modulus of elasticity of said material of said plate coupon, a thickness dimension of said plate coupon, a maximum displacement measured on said coupon surface, Poisson's ratio, a length dimension of said plate coupon, and a width dimension of said plate coupon.

6. The method of claim 3 further comprising the steps of:
    building an empirical database of different peening intensities of said shot peening process; and
    correlating different calculated moment coefficients with each of said peening intensities of said database of different peening intensities.

7. The method of claim 1 wherein said step of calculating said moment coefficient comprises the steps of:
    physically measuring displacement of said coupon surface;
    fitting displacement measurements to a displacement shape function; and
    calculating said moment coefficient based upon said displacement shape function.

8. The method of claim 1 wherein said step of calculating said moment coefficient comprises the steps of:
    applying said fitted induced residual stress measurements to a coupon model of said plate coupon;

extracting measurements of displacement of said coupon surface resulting from application of said fitted induced residual stress measurements to said coupon model;

fitting said measurements of displacement of said coupon surface to a displacement shape function; and calculating said moment coefficient based on a fitted coefficient of said displacement shape function in at least one of said x, y, and xy-directions and a thickness dimension of said plate coupon.

9. The method of claim 1 wherein said curve shaped function is a polynomial function.

10. The method of claim 1 wherein said calibrated stress function comprises a step function.

11. The method of claim 1 wherein said calibrated stress function comprises a $3^{rd}$ order term function.

12. The method of claim 1 further comprising the steps of:
building an empirical database of different peening intensities of said shot peening process; and
correlating different calculated moment coefficients with each of said peening intensities of said database of different peening intensities.

13. A system for predicting distortion in a workpiece, comprising a material, resulting from a shot peening process to induce compressive stresses in said workpiece, said system comprising:
a shot peening machine operable for impacting a surface with shot during said shot peening process, said shot peening process having set physical parameters comprising peening intensity, peening time, shot speed, shot hardness, and impact angle;
a plate coupon, comprising said material, wherein said plate coupon is subjected to shot peening to induce a residual stress in a coupon surface of said plate coupon;
a stress measurement tool configured for measuring induced residual stress in said coupon surface of said plate coupon along at least one of an x-direction, a y-direction, and an xy-direction;
at least one processor; and
a non-transitory computer-readable storage medium storing executable instruction executed by said processor, wherein said executable instructions comprise:
a stress measurement fitter configured for fitting induced residual stress measurements to a curve shaped function;
a coefficient calculator configured for calculating a moment coefficient of said induced residual stress in said coupon surface of said plate coupon;
a stress function calibrator configured for:
calibrating a stress function to said moment coefficient, wherein a calibrated stress function comprises a depth term and a stress magnitude term;
fixing said depth term of said calibrated stress function to be less than a depth at which said induced residual stress measurements diminish to zero in said plate coupon;
equating a moment of said calibrated stress function to said moment coefficient; and
solving for said stress magnitude term of said stress function;
a stress function applicator configured for applying said calibrated stress function to a workpiece model of said workpiece; and
a distortion predictor configured for predicting distortion of said workpiece subjected to said shot peening using said parameters to achieve a desired induced residual stress in said workpiece, based on application of said calibrated stress function to said workpiece model.

14. The system of claim 13 wherein said moment coefficient is representative of said residual stress induced in said coupon surface of said plate coupon in response to said shot peening.

15. The system of claim 13 wherein said induced stress measurements are representative of said residual stress induced in said coupon surface of said plate coupon in response to said shot peening.

16. The system of claim 13 wherein said moment coefficient is representative of a measured displacement in said coupon surface of said plate coupon in response to said shot peening.

17. The system of claim 16 wherein said moment coefficient is calculated based on a flexural rigidity of said plate coupon, Poisson's ratio, a length dimension of said plate coupon, a width dimension of said plate coupon, and a maximum displacement measured on said coupon surface.

18. The system of claim 16 wherein said moment coefficient is calculated based on a modulus of elasticity of said material of said plate coupon, a thickness dimension of said plate coupon, a maximum displacement measured on said coupon surface, Poisson's ratio, a length dimension of said plate coupon, and a width dimension of said plate coupon.

19. The method of claim 1 further comprising:
adjusting said peening intensity of said shot peening process; and
predicting an adjusted distortion of said workpiece in response to said shot peening using an adjusted peening intensity.

20. The method of claim 1 further comprising adjusting said workpiece model based on predicted distortion.

* * * * *